United States Patent
Zhang et al.

(10) Patent No.: US 11,038,734 B2
(45) Date of Patent: Jun. 15, 2021

(54) MINI-SLOT CONFIGURATION FOR DATA COMMUNICATION

(71) Applicant: HUAWEI TECHNOLOGIES CO., LTD., Guangdong (CN)

(72) Inventors: Xu Zhang, Beijing (CN); Hao Sun, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 19 days.

(21) Appl. No.: 16/523,701

(22) Filed: Jul. 26, 2019

(65) Prior Publication Data

US 2019/0349242 A1 Nov. 14, 2019

Related U.S. Application Data

(63) Continuation of application No. PCT/CN2018/074233, filed on Jan. 26, 2018.

(30) Foreign Application Priority Data

Jan. 26, 2017 (CN) .......................... 201710061828.1

(51) Int. Cl.
*H04L 27/26* (2006.01)
*H04L 5/00* (2006.01)
*H04W 72/04* (2009.01)

(52) U.S. Cl.
CPC ........ *H04L 27/2666* (2013.01); *H04L 5/0005* (2013.01); *H04L 5/0064* (2013.01); *H04W 72/0446* (2013.01)

(58) Field of Classification Search
CPC ............. H04L 41/0668; H04L 12/4641; H04L 41/0677; H04L 45/22; H04L 27/2666; H04L 5/0005; H04W 72/04446
See application file for complete search history.

(56) References Cited

U.S. PATENT DOCUMENTS

2002/0169008 A1* 11/2002 Hiben ............... H04W 52/0229
455/574
2009/0060081 A1* 3/2009 Zhang ................... H04L 5/0023
375/267

(Continued)

FOREIGN PATENT DOCUMENTS

CN 103843280 A 6/2014

OTHER PUBLICATIONS

Huawei et al.,"Discussion on slot and mini-slot ",3GPP TSG RAN WG1 Meeting #86bis R1-1608837,Lisbon, Portugal, Oct. 10-14, 2016, 4 pages.

(Continued)

*Primary Examiner* — Jael M Ulysse
(74) *Attorney, Agent, or Firm* — Fish & Richardson P.C.

(57) ABSTRACT

The present disclosure relates to communication methods. In one example method, an access network device and a terminal each determine a format of at least one mini-slot group based on a first subcarrier width used for a first control channel and a second subcarrier width used for a second control channel. The access network device sends first indication information and second indication information to the terminal. The terminal determines, based on the first indication information, a time-domain location of each mini-slot group in which the second control channel is carried, and determines, based on the format of the at least one mini-slot group and the second indication information, a time-domain location of a mini-slot that is in each mini-slot group and in which the second control channel is carried.

14 Claims, 7 Drawing Sheets

(56) References Cited

U.S. PATENT DOCUMENTS

| | | | | |
|---|---|---|---|---|
| 2010/0098139 | A1* | 4/2010 | Braithwaite | H04L 27/2621 375/219 |
| 2010/0278123 | A1* | 11/2010 | Fong | H04L 5/0007 370/329 |
| 2010/0331030 | A1* | 12/2010 | Nory | H04L 5/0053 455/509 |
| 2011/0158188 | A1* | 6/2011 | Womack | H04L 5/0048 370/329 |
| 2011/0243039 | A1* | 10/2011 | Papasakellariou | H04L 5/0042 370/280 |
| 2012/0142340 | A1* | 6/2012 | Ofir | H04W 48/12 455/426.1 |
| 2012/0142363 | A1* | 6/2012 | Elmaleh | H04W 48/10 455/450 |
| 2012/0208583 | A1* | 8/2012 | Chung | H04W 52/34 455/509 |
| 2013/0195041 | A1* | 8/2013 | Papasakellariou | H04L 1/0038 370/329 |
| 2013/0235812 | A1* | 9/2013 | Heo | H04L 5/0023 370/329 |
| 2014/0328307 | A1* | 11/2014 | Takano | H04W 48/18 370/329 |
| 2015/0003409 | A1 | 1/2015 | Hoymann | |
| 2015/0195062 | A1* | 7/2015 | Hwang | H04L 1/1607 370/329 |
| 2016/0037491 | A1* | 2/2016 | Hwang | H04L 1/1607 370/330 |
| 2017/0013618 | A1* | 1/2017 | Shin | H04L 5/001 |
| 2018/0198594 | A1* | 7/2018 | Tiirola | H04W 74/006 |

OTHER PUBLICATIONS

Intel Corporation,"On URLLC mini-slot structure",3GPP TSG RAN WG1 Meeting #86bis R1-1609510,Lisbon, Portugal, Oct. 10-14, 2016, 5 pages.

Motorola Mobility,"Flexible frame structure and control signaling for NR",3GPP TSG RAN WG1 Meeting #86bis R1-1609919,Oct. 10-14, 2016,Lisbon, Portugal, 4 pages.

PCT International Search Report and Written Opinion in International Application No. PCT/CN2018/074,233, dated Mar. 29, 2018, 17 pages (With English Translation).

Extended European Search Report issued in European Application No. 18743967.4 dated Dec. 12, 2019, 15 pages.

R1-1700209—CATT, "DL control channel design for mini-slot based scheduling," 3GPP DRAFT; 3GPP TSG RAN WG1 AH_NR Meeting, Spokane, USA, Jan. 16-20, 2017, XP051202713, 3 pages.

R1-1611959—Intel Corporation, "Slot and mini-slot multiplexing and alignment," 3GPP DRAFT, 3GPP TSG RAN WG1 Meeting #87, Reno, USA, Nov. 14-18, 2016, XP051175925, 4 pages.

3GPP TR 38.802 V1.0.0 (Nov. 2016), 3rd Generation Partnership Project; Technical Specification Group Radio Access Network; Study on New Radio (NR) Access Technology; Physical Layer Aspects (Release 14), Nov. 2016, 64 pages.

NTT Docomo, "Status Report for RAN WG1 to TSG-RAN #74," 3GPP TSG RAN#74, RP-161937, Vienna, Austria, Dec. 5-8, 2016, 42 pages.

Office Action issued in Chinese Application No. 201710061828.1 dated May 21, 2020, 11 pages (with English translation).

Qualcomm, "NR R14 Prioritization," 3GPP TSG RAN#74, RP-162478, Vienna, Austria, Dec. 2016.

* cited by examiner

MINI-SLOT CONFIGURATION FOR DATA COMMUNICATION

CROSS-REFERENCE TO RELATED APPLICATIONS

This application is a continuation of International Application No. PCT/CN2018/074233, filed on Jan. 26, 2018, which claims priority to Chinese Patent Application No. 201710061828.1, filed on Jan. 26, 2017. The disclosures of the aforementioned applications are hereby incorporated by reference in their entireties.

TECHNICAL FIELD

Embodiments of this application relate to the field of communications technologies, and in particular, to a communication method, a communications apparatus, and a communications system.

BACKGROUND

A long term evolution (Long Term Evolution, LTE) system standard formulated by the 3rd Generation Partnership Project (the 3rd Generation Partnership Project, 3GPP) is considered as a fourth generation radio access system standard. In an existing LTE system, both uplink transmission and downlink transmission are organized into a system frame (English: system frame) of 10 ms in time domain, where the system frame is also referred as a radio frame (English: radio frame). LTE supports two system frame structures: a type 1 used for frequency division duplex (English: Frequency Division Duplex, FDD) and a type 2 used for time division duplex (English: Time Division Duplex, TDD). In a case of FDD, each system frame includes 10 subframes (English: subframe). Each subframe includes two consecutive slots (English: slot). One slot includes a plurality of symbols (English: symbol). A single carrier frequency division multiple access (Single Carrier Frequency Division Multiple Access, SC-FDMA) symbol is used for an uplink, and an orthogonal frequency division multiplexing (Orthogonal Frequency Division Multiplexing, OFDM) symbol is used for a downlink. That an OFDM symbol is used for a downlink is used as an example. One slot includes a plurality of consecutive OFDM symbols in time domain, and a subcarrier width used for a data channel of each slot is 15 kHz.

A next generation communications system is, for example, a new radio (English: New Radio, NR) system, which is also referred to as a fifth generation (5G) radio access system. The NR system supports a plurality of subcarrier widths, such as 15 kHz, 30 kHz, 60 kHz, and 120 kHz, and a ratio of any two subcarrier widths is equal to 2n, where n=−N, . . . , −2, −1, 1, 2, . . . , and N. Further, based on considerations including but not limited to a requirement of an ultra-low latency sensitive service (such as a URLLC service) on an ultra-low latency and a requirement of NR and LTE coexistence, information is scheduled by adding a time granularity of mini-slot to the NR system. One mini-slot includes a plurality of consecutive OFDM symbols in time domain, one slot may include a plurality of mini-slots, and a quantity of OFDM symbols in the mini-slot is less than a quantity of OFDM symbols in the slot. A subcarrier width M used for a first control channel carried in the mini-slot and a subcarrier width W used for a second control channel carried in the slot may be the same or different.

When M is different from W, a solution for detecting time-domain locations of candidate control channels in all mini-slots cannot be provided for a terminal because a subcarrier width change is not considered in the existing LTE system. When needing to receive downlink data information, the terminal needs to detect both the first control channel and the second control channel. After the two control channels are superimposed in time domain, the terminal needs to detect a plurality of control channels in unit time. When an access network device has not sent downlink data information to the terminal within a period of time, the terminal consumes relatively much energy to detect control information carried on the second control channel. If the terminal has not detected, within this period of time, the control information sent to the terminal, energy cost for receiving data information is excessively high.

Therefore, how the terminal determines a time-domain location of a mini-slot in which a second control channel is carried becomes a problem to be resolved urgently.

SUMMARY

This application provides a communication method, to resolve a technical problem in the prior art that a time-domain location of a mini-slot in which a second control channel is carried cannot be flexibly indicated based on different subcarrier widths used for the second control channel, and further resolve a problem of excessively high energy consumption resulting from detection of control channels of all mini-slots by a terminal.

According to a first aspect, this application provides a communication method, where the method includes: learning, by a terminal, of a format of at least one mini-slot group based on a first subcarrier width used for a first control channel and a second subcarrier width used for a second control channel, where a slot in which the first control channel is carried includes the at least one mini-slot group, the mini-slot group includes at least one mini-slot, the second control channel is carried in the mini-slot, and the first subcarrier width is different from the second subcarrier width; receiving, by the terminal, first signaling sent by an access network device, where the first signaling includes first indication information; determining, by the terminal based on the first indication information, a time-domain location of each mini-slot group in which the second control channel is carried; receiving, by the terminal, second signaling sent by the access network device, where the second signaling includes second indication information; and determining, by the terminal based on the format of the mini-slot group and the second indication information, a time-domain location of a mini-slot that is in each mini-slot group and in which the second control channel is carried.

When a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried, so as to effectively improve indication flexibility. In addition, according to this solution, the terminal may detect the second control channel only at a specified time-domain location, without performing detection at other time-domain locations. In this way, energy consumption of detecting a control channel by the terminal can be effectively reduced.

In an optional design, the terminal learns of a format of the first signaling based on the first subcarrier width used for the first control channel and the second subcarrier width used for the second control channel, and obtains the first indication information based on the format of the first signaling.

In an optional design, the terminal obtains a format of the second signaling based on the first subcarrier width used for the first control channel and the second subcarrier width used for the second control channel; and obtains the second indication information based on the format of the second signaling. In this way, the terminal device can obtain the format of the corresponding first signaling based on the different subcarrier widths, and can flexibly indicate the time-domain location of the second control channel when the second subcarrier width varies.

In an optional design, the terminal obtains a format of the second signaling based on the first subcarrier width used for the first control channel and the second subcarrier width used for the second control channel; and obtains the second indication information based on the format of the second signaling. In this way, the terminal device can obtain the format of the corresponding second signaling based on the different subcarrier widths, and can flexibly indicate the time-domain location of the second control channel when the second subcarrier width varies.

In an optional design, the terminal receives third indication information, and obtains the first subcarrier width and the second subcarrier width based on the third indication information.

In an optional design, the third indication information may be carried by using the second signaling.

In an optional design, the third indication information may be carried by using third signaling. Optionally, the third signaling may be higher layer signaling or physical layer signaling. This is not limited in this application.

In an optional design, the method further includes: detecting, by the terminal, the second control channel at the time-domain location of each mini-slot in which the second control channel is carried.

In an optional design, the method further includes: sending, by the terminal, uplink data at a time-domain location of each mini-slot in which the second control channel is carried.

In an optional design, the first signaling is control information carried on the first control channel, and the second signaling is higher layer signaling.

A time-frequency resource occupied by the first control channel may be a time-frequency resource area of a plurality of consecutive OFDM symbols including a starting OFDM symbol in the slot. The first control channel includes but is not limited to a physical downlink control channel (English: Physical Downlink Control Channel, PDCCH), an enhanced physical downlink control channel (English: Enhanced Physical Downlink Control Channel, EPDCCH), a new radio physical downlink control channel (English: New radio Physical Downlink Control Channel, NR-PDCCH), a group common control channel (English: Group Common Control Channel, GCCCH), a physical control format indicator channel (Physical Control Format Indicator Channel, PCFICH), a physical control format indicator channel-like channel (English: PCFICH-like Channel), a physical layer broadcast channel (English: L1 Broadcast Channel), or a control channel that is in an NR system and that is used to perform a same or similar function.

An overhead of the control information carried on the first control channel, for example, downlink control information in LTE, cannot be excessively large. Therefore, an overhead of the first signaling can be effectively reduced by adding the first indication information and the second indication information to different pieces of signaling.

In an optional design, the terminal receives, in a first frequency band, the first signaling sent by the access network device, and receives, in a second frequency band, the control information that is carried on the second control channel and that is sent by the access network device, where the first frequency band and the second frequency band are orthogonal to each other in frequency domain. Therefore, the terminal can receive, both in a same frequency band and different frequency bands, control information that is in a mini-slot and that is sent by the access network device, so as to improve data transmission flexibility.

According to a second aspect, this application provides a communication method, where the method includes: determining, by an access network device, a format of at least one mini-slot group based on a first subcarrier width used for a first control channel and a second subcarrier width used for a second control channel, where a slot in which the first control channel is carried includes the at least one mini-slot group, the mini-slot group includes at least one mini-slot, the second control channel is carried in the mini-slot, and the first subcarrier width is different from the second subcarrier width; sending, by the access network device, first signaling to a terminal, where the first signaling includes first indication information, and the first indication information is used to indicate a time-domain location of each mini-slot group in which the second control channel is carried; and sending, by the access network device, second signaling to the terminal based on the format of the mini-slot group, where the second signaling includes second indication information, and the second indication information is used to indicate a time-domain location of a mini-slot that is in each mini-slot group and in which the second control channel is carried.

When a subcarrier width used for the first control channel is different from a subcarrier width used for the second control channel, the access network device sends the first indication information and the second indication information to the terminal, so that the terminal can finally determine, based on indication of the indication information, a time-domain location of the second control channel on which control information sent by the access network device to the terminal is carried, so as to effectively improve indication flexibility. In addition, according to this solution, the terminal may detect the second control channel only at a specified time-domain location, without performing detection at other time-domain locations. In this way, energy consumption of detecting a control channel by the terminal can be effectively reduced.

In an optional design, the access network device determines a format of the first signaling based on the first subcarrier width used for the first control channel and the second subcarrier width used for the second control channel; and determines the first indication information based on the format of the first signaling. In this way, when the second subcarrier width varies, the first indication information may be carried based on the determined format of the first signaling, so as to flexibly indicate the time-domain location of the second control channel.

In an optional design, the access network device determines a format of the second signaling based on the first subcarrier width used for the first control channel and the second subcarrier width used for the second control channel; and determines the second indication information based on the format of the second signaling. In this way, when the second subcarrier width varies, the second indication information may be carried based on the determined format of the second signaling, so as to flexibly indicate the time-domain location of the second control channel.

In an optional design, the access device sends third indication information to the terminal, where the third indication information is used to indicate the first subcarrier width used for the first control channel and the second subcarrier width used for the second control channel.

In an optional design, the first signaling is control information carried on the first control channel, and the second signaling is higher layer signaling.

A time-frequency resource occupied by the first control channel may be a time-frequency resource area of a plurality of consecutive OFDM symbols including a starting OFDM symbol in the slot. The first control channel includes but is not limited to a physical downlink control channel (English: Physical Downlink Control Channel, PDCCH), an enhanced physical downlink control channel (English: Enhanced Physical Downlink Control Channel, EPDCCH), a new radio physical downlink control channel (English: New radio Physical Downlink Control Channel, NR-PDCCH), a group common control channel (English: Group Common Control Channel, GCCCH), a physical control format indicator channel (Physical Control Format Indicator Channel, PCFICH), a physical control format indicator channel-like channel (English: PCFICH-like Channel), a physical layer broadcast channel (English: L1 Broadcast Channel), or a control channel that is in an NR system and that is used to perform a same or similar function.

An overhead of the control information carried on the first control channel, for example, downlink control information in LTE, cannot be excessively large. Therefore, an overhead of the first signaling can be effectively reduced by adding the first indication information and the second indication information to different pieces of signaling.

In an optional design, the access network device sends the first signaling to the terminal in a first frequency band, and sends, in a second frequency band, the control information carried on the second control channel, where the first frequency band and the second frequency band are orthogonal to each other in frequency domain. Therefore, the terminal can send, both in a same frequency band and different frequency bands, control information that is in a mini-slot and that is sent to the access network device, so as to improve data transmission flexibility.

According to a third aspect, this application provides a communication method, where the method includes: learning, by a terminal, of a format of control signaling based on a first subcarrier width used for a first control channel and a second subcarrier width used for a second control channel, where the first subcarrier width is different from the second subcarrier width, a slot in which the first control channel is carried includes at least one mini-slot, and the second control channel is carried in the mini-slot; receiving, by the terminal, the control signaling sent by the access network device, where the control signaling includes first indication information, and the indication information is used to indicate a time-domain location of each mini-slot in which the second control channel is carried; obtaining, by the terminal, the first indication information based on the format of the control signaling; and determining, by the terminal based on the first indication information, the time-domain location of each mini-slot in which the second control channel is carried.

When a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried, so as to effectively improve indication flexibility. In addition, according to this solution, the terminal may detect the second control channel only at a specified time-domain location, without performing detection at other time-domain locations. In this way, energy consumption of detecting a control channel by the terminal can be effectively reduced.

In an optional design, the method further includes: receiving, by the terminal, second indication information; and obtaining, by the terminal, the first subcarrier width and the second subcarrier width based on the second indication information.

In an optional design, the method further includes: detecting, by the terminal, the second control channel at the time-domain location of each mini-slot in which the second control channel is carried.

In an optional design, the method further includes: sending, by the terminal, uplink data at the time-domain location of each mini-slot in which the second control channel is carried.

In an optional design, the control signaling is control information carried on the first control channel. A time-frequency resource occupied by the first control channel may be a time-frequency resource area of a plurality of consecutive OFDM symbols including a starting OFDM symbol in the slot. The first control channel includes but is not limited to a physical downlink control channel (English: Physical Downlink Control Channel, PDCCH), an enhanced physical downlink control channel (English: Enhanced Physical Downlink Control Channel, EPDCCH), a new radio physical downlink control channel (English: New radio Physical Downlink Control Channel, NR-PDCCH), a group common control channel (English: Group Common Control Channel, GCCCH), a physical control format indicator channel (Physical Control Format Indicator Channel, PCFICH), a physical control format indicator channel-like channel (English: PCFICH-like Channel), a physical layer broadcast channel (English: L1 Broadcast Channel), or a control channel that is in an NR system and that is used to perform a same or similar function.

In an optional design, the terminal receives, in a first frequency band, the first signaling sent by the access network device, and receives, in a second frequency band, the control information that is carried on the second control channel and that is sent by the access network device, where the first frequency band and the second frequency band are orthogonal to each other in frequency domain. Therefore, the terminal can receive, both in a same frequency band and different frequency bands, control information that is in a mini-slot and that is sent by the access network device, so as to improve data transmission flexibility.

According to a fourth aspect, this application provides a communication method, where the method includes: determining, by an access network device, a format of control signaling based on a first subcarrier width used for a first control channel and a second subcarrier width used for a second control channel, where the first subcarrier width is different from the second subcarrier width, a slot in which the first control channel is carried includes at least one mini-slot, and the second control channel is carried in the mini-slot; and sending, by the access network device, the control signaling to a terminal device based on the format of the control signaling, where the control signaling includes first indication information, and the indication information is used to indicate a time-domain location of each mini-slot in which the second control channel is carried.

When a subcarrier width used for the first control channel is different from a subcarrier width used for the second control channel, the terminal device finally determines, based on the first indication information sent by the access network device, a time-domain location of the second control channel on which control information sent by the access network device to the terminal is carried, so as to effectively improve indication flexibility. In addition, according to this solution, the terminal may detect the second control channel only at a specified time-domain location, without performing detection at other time-domain locations. In this way, energy consumption of detecting a control channel by the terminal can be effectively reduced.

In an optional design, the method further includes: sending, by the access network device, the second indication information; and obtaining, by the terminal, the first subcarrier width and the second subcarrier width based on the second indication information.

In an optional design, the method further includes: detecting, by the terminal, the second control channel at the time-domain location of each mini-slot in which the second control channel is carried.

In an optional design, the method further includes: sending, by the terminal, uplink data at the time-domain location of each mini-slot in which the second control channel is carried.

In an optional design, the control signaling is control information carried on the first control channel. A time-frequency resource occupied by the first control channel may be a time-frequency resource area of a plurality of consecutive OFDM symbols including a starting OFDM symbol in the slot. The first control channel includes but is not limited to a physical downlink control channel (English: Physical Downlink Control Channel, PDCCH), an enhanced physical downlink control channel (English: Enhanced Physical Downlink Control Channel, EPDCCH), a new radio physical downlink control channel (English: New radio Physical Downlink Control Channel, NR-PDCCH), a group common control channel (English: Group Common Control Channel, GCCCH), a physical control format indicator channel (Physical Control Format Indicator Channel, PCFICH), a physical control format indicator channel-like channel (English: PCFICH-like Channel), a physical layer broadcast channel (English: L1 Broadcast Channel), or a control channel that is in an NR system and that is used to perform a same or similar function.

In an optional design, the terminal receives, in a first frequency band, the first signaling sent by the access network device, and receives, in a second frequency band, the control information that is carried on the second control channel and that is sent by the access network device, where the first frequency band and the second frequency band are orthogonal to each other in frequency domain. Therefore, the terminal can receive, both in a same frequency band and different frequency bands, control information that is in a mini-slot and that is sent by the access network device, so as to improve data transmission flexibility.

According to a fifth aspect, an embodiment of this application provides a communications apparatus, configured to perform the method in any one of the first aspect or possible designs of the first aspect. Specifically, the communications apparatus includes units configured to perform the method in any one of the first aspect or possible designs of the first aspect. The communications apparatus may be a device or a chip in a device. When the communications apparatus is a device, the device includes a processing unit and a transceiver unit. The processing unit may be a processor. The transceiver unit may be a transceiver. The transceiver includes a radio frequency circuit. Optionally, the device further includes a storage unit. The storage unit may be a memory. When the communications apparatus is a chip in a device, the chip includes a processing unit and a transceiver unit. The processing unit may be a processor. The transceiver unit may be an input/output interface, a pin, a circuit, or the like on the chip. The processing unit may execute a computer execution instruction stored in a storage unit. Optionally, the storage unit may be a storage unit (such as a register or a cache) in the chip, or the storage unit may be a storage unit (such as a read-only memory (read-only memory, ROM) located outside the chip in the device, another type of static storage device (such as a random access memory (random access memory, RAM)) that is located outside the chip in the device and that can store static information and a static instruction, or the like. Any processor mentioned above may be a central processing unit (central processing unit, CPU), a microprocessor, or an application-specific integrated circuit (application specific integrated circuit, ASIC), or may be one or more integrated circuits configured to control program execution of the signal sending method in any possible implementation of the first aspect.

According to a sixth aspect, an embodiment of this application provides a communications apparatus, configured to perform the method in any one of the second aspect or possible designs of the second aspect. Specifically, the communications apparatus includes units configured to perform the method in any one of the second aspect or possible designs of the second aspect. The communications apparatus may be a device or a chip in a device. When the communications apparatus is a device, the device includes a processing unit and a transceiver unit. The processing unit may be a processor. The transceiver unit may be a transceiver. The transceiver includes a radio frequency circuit. Optionally, the device further includes a storage unit. The storage unit may be a memory. When the communications apparatus is a chip in a device, the chip includes a processing unit and a transceiver unit. The processing unit may be a processor. The transceiver unit may be an input/output interface, a pin, a circuit, or the like on the chip. The processing unit may execute a computer execution instruction stored in a storage unit. Optionally, the storage unit may be a storage unit (such as a register or a cache) in the chip, or the storage unit may be a storage unit (such as a read-only memory (read-only memory, ROM) located outside the chip in the device, another type of static storage device (such as a random access memory (random access memory, RAM)) that is located outside the chip in the device and that can store static information and a static instruction, or the like. Any processor mentioned above may be a central processing unit (central processing unit, CPU), a microprocessor, or an application-specific integrated circuit (application specific integrated circuit, ASIC), or may be one or more integrated circuits configured to control program execution of the signal sending method in any possible implementation of the first aspect.

According to a seventh aspect, an embodiment of this application provides a communications apparatus, configured to perform the method in any one of the third aspect or possible designs of the third aspect. Specifically, the communications apparatus includes units configured to perform the method in any one of the third aspect or possible designs of the third aspect. The communications apparatus may be a device or a chip in a device. When the communications apparatus is a device, the device includes a processing unit and a transceiver unit. The processing unit may be a processor. The transceiver unit may be a transceiver. The transceiver includes a radio frequency circuit. Optionally, the device further includes a storage unit. The storage unit may be a memory. When the communications apparatus is a chip in a device, the chip includes a processing unit and a transceiver unit. The processing unit may be a processor. The transceiver unit may be an input/output interface, a pin, a circuit, or the like on the chip. The processing unit may execute a computer execution instruction stored in a storage unit. Optionally, the storage unit may be a storage unit (such as a register or a cache) in the chip, or the storage unit may be a storage unit (such as a read-only memory (read-only memory, ROM) located outside the chip in the device, another type of static storage device (such as a random access memory (random access memory, RAM)) that is located outside the chip in the device and that can store static information and a static instruction, or the like. Any processor mentioned above may be a central processing unit (central processing unit, CPU), a microprocessor, or an application-specific integrated circuit (application specific integrated circuit, ASIC), or may be one or more integrated circuits configured to control program execution of the signal sending method in any possible implementation of the first aspect.

According to an eighth aspect, an embodiment of this application provides a communications apparatus, configured to perform the method in any one of the fourth aspect or possible designs of the fourth aspect. Specifically, the communications apparatus includes units configured to perform the method in any one of the fourth aspect or possible designs of the fourth aspect. The communications apparatus may be a device or a chip in a device. When the communications apparatus is a device, the device includes a processing unit and a transceiver unit. The processing unit may be a processor. The transceiver unit may be a transceiver. The transceiver includes a radio frequency circuit. Optionally, the device further includes a storage unit. The storage unit may be a memory. When the communications apparatus is a chip in a device, the chip includes a processing unit and a transceiver unit. The processing unit may be a processor. The transceiver unit may be an input/output interface, a pin, a circuit, or the like on the chip. The processing unit may execute a computer execution instruction stored in a storage unit. Optionally, the storage unit may be a storage unit (such as a register or a cache) in the chip, or the storage unit may be a storage unit (such as a read-only memory (read-only memory, ROM) located outside the chip in the device, another type of static storage device (such as a random access memory (random access memory, RAM)) that is located outside the chip in the device and that can store static information and a static instruction, or the like. Any processor mentioned above may be a central processing unit (central processing unit, CPU), a microprocessor, or an application-specific integrated circuit (application specific integrated circuit, ASIC), or may be one or more integrated circuits configured to control program execution of the signal sending method in any possible implementation of the first aspect.

According to a ninth aspect, an embodiment of this application provides a terminal. The terminal includes a transceiver unit, a processor, and a memory. The transceiver unit, the processor, and the memory are connected by using a bus system. The memory is configured to store a program, an instruction, or code. The processor is configured to execute the program, the instruction, or the code in the memory, to implement the method in any one of the first aspect or possible designs of the first aspect.

According to a tenth aspect, an embodiment of this application provides an access network device. The access network device includes a transceiver unit, a processor, and a memory. The transceiver unit, the processor, and the memory are connected by using a bus system. The memory is configured to store a program, an instruction, or code. The processor is configured to execute the program, the instruction, or the code in the memory, to implement the method in any one of the second aspect or possible designs of the second aspect.

According to an eleventh aspect, an embodiment of this application provides a terminal. The terminal includes a transceiver unit, a processor, and a memory. The transceiver unit, the processor, and the memory are connected by using a bus system. The memory is configured to store a program, an instruction, or code. The processor is configured to execute the program, the instruction, or the code in the memory, to implement the method in any one of the third aspect or possible designs of the third aspect.

According to a fourteenth aspect, an embodiment of this application provides an access network device. The access network device includes a transceiver unit, a processor, and a memory. The transceiver unit, the processor, and the memory are connected by using a bus system. The memory is configured to store a program, an instruction, or code. The processor is configured to execute the program, the instruction, or the code in the memory, to implement the method in any one of the fourth aspect or possible designs of the fourth aspect.

According to a fifteenth aspect, an embodiment of this application provides a computer readable storage medium or a computer program product, configured to store a computer program. The computer program is used to execute an instruction of the method in any one of the first aspect, the second aspect, the third aspect, the fourth aspect, possible designs of the first aspect, possible designs of the second aspect, possible designs of the third aspect, or possible designs of the fourth aspect.

DESCRIPTION OF DRAWINGS

To describe the technical solutions in the embodiments of this application more clearly, the following briefly describes the accompanying drawings required for describing the embodiments. Apparently, the accompanying drawings in the following description show merely some embodiments of this application, and a person of ordinary skill in the art may derive other drawings from these accompanying drawings without creative efforts.

DESCRIPTION OF EMBODIMENTS

Figure 1:
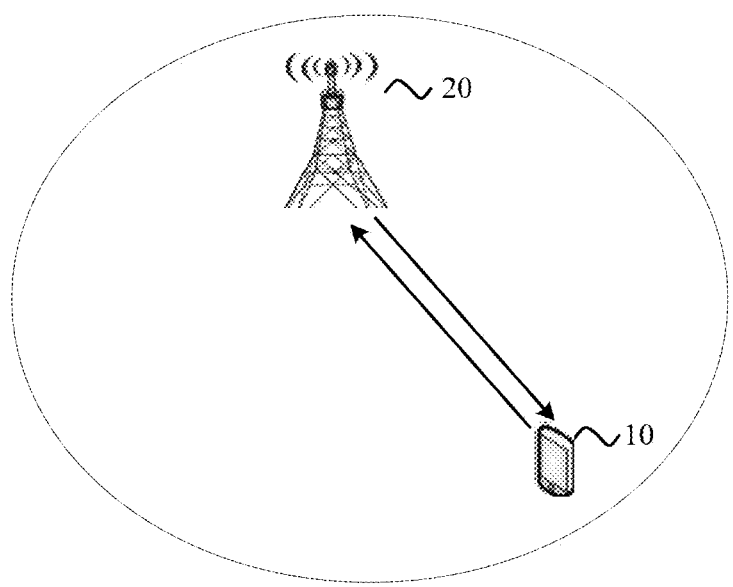
FIG. 1 is a schematic diagram of an application network scenario of a communication method according to an embodiment of this application.

Technical solutions of the embodiments of this application may be applied to various communications systems, such as: a new radio (New Radio, NR) system, a Wireless Fidelity (Wi-Fi) system, a Worldwide Interoperability for Microwave Access (Worldwide Interoperability for Microwave Access, WiMAX) system, a Global System for Mobile Communications (Global System of Mobile communication, GSM) system, a Code Division Multiple Access (Code Division Multiple Access, CDMA) system, a Wideband Code Division Multiple Access (Wideband Code Division Multiple Access, WCDMA) system, a general packet radio service (General Packet Radio Service, GPRS) system, a Long Term Evolution (Long Term Evolution, LTE) system, an advanced Long Term Evolution (Advanced long term evolution, LTE-A) system, a Universal Mobile Telecommunications System (Universal Mobile Telecommunication System, UMTS), a cellular system related to the 3rd Generation Partnership Project (the 3rd Generation Partnership Project, 3GPP), a fifth generation (the Fifth Generation, 5G) mobile communications system, or the like.

The following describes some terms in this application, to facilitate understanding of a person skilled in the art.

(1) A terminal is also referred to as user equipment (User Equipment, UE) or a terminal device, and is a device that provides voice and/or data connectivity for a user. The terminal may be a wireless terminal or a wired terminal. The wireless terminal may communicate with one or more core networks through a radio access network (Radio Access Network, RAN). The wireless terminal may be a mobile terminal, such as a mobile phone (also referred to as a "cellular" phone) and a computer with a mobile terminal. For example, the wireless terminal may be a portable, pocket-sized, handheld, computer built-in, or vehicle-mounted mobile apparatus, which exchanges voice and/or data with the radio access network. For example, the wireless terminal may be a personal communications service (Personal Communication Service, PCS) phone, a cordless telephone set, a Session Initiation Protocol (Session Initiation Protocol, SIP) phone, a wireless local loop (Wireless Local Loop, WLL) station, a personal digital assistant (Personal Digital Assistant, PDA), a tablet computer, a notebook computer, a palmtop computer, a mobile Internet device (mobile Internet device, MID), or a wearable device, such as a smartwatch, a smart band, or a pedometer. The wireless terminal may also be referred to as a system, a subscriber unit (Subscriber Unit, SU), a subscriber station (Subscriber Station, SS), a mobile station (Mobile Station, MB), a mobile console (Mobile), a remote station (Remote Station, RS), an access point (Access Point, AP), a remote terminal (Remote Terminal, RT), an access terminal (Access Terminal, AT), a user terminal (User Terminal, UT), a user agent (User Agent, UA), or a terminal (User Device, UD).

(2) An access network device may be a gNB (gNodeB), a common base station (such as a NodeB (NodeB, NB) in a WCDMA system, an evolved NodeB (Evolutional NodeB, eNB or eNodeB) in an LTE system, or a base transceiver station (Base Transceiver Station, BTS) in GSM or CDMA), a new radio controller (New Radio controller, NR controller), a centralized unit (Centralized Unit), a new radio base station, a remote radio unit, a micro base station, a distributed unit (Distributed Unit), a transmission/reception point (Transmission/Reception Point, TRP) or a transmission point (Transmission Point, TP), or a radio controller in a cloud access network (Cloud Radio Access Network, CRAN) scenario; or the network device may be a relay station, an access point, a vehicle-mounted device, a wearable device, and a network device in a future 5G network, a network device in a future evolved PLMN network, or any other radio access devices, but the embodiments of this application are not limited thereto.

(3) A symbol includes but is not limited to an orthogonal frequency division multiplexing (Orthogonal Frequency Division Multiplexing, OFDM) symbol, a sparse code multiple access (Sparse Code Multiplexing Access, SCMA) symbol, a filtered orthogonal frequency division multiplexing (Filtered Orthogonal Frequency Division Multiplexing, F-OFDM) symbol, and a non-orthogonal multiple access (Non-Orthogonal Multiple Access, NOMA) symbol, and may be specifically determined depending on an actual situation. Details are not described herein again.

(4) Subframe: One subframe occupies a time-frequency resource of entire system bandwidth in frequency domain, and in time domain, occupies a fixed time length, for example, one millisecond (ms). In addition, one subframe may also occupy K consecutive symbols, where K is a natural number greater than zero. A value of K may be determined depending on an actual situation, and is not limited herein. For example, in LTE, one subframe occupies 14 consecutive OFDM symbols in time domain.

(5) Slot (slot) is a basic time-frequency resource element, and occupies L consecutive OFDM symbols in time domain, where L is a natural number greater than zero. A value of L may be determined depending on an actual situation, for example, 7 or 14.

(6) A mini-slot occupies a plurality of consecutive OFDM symbols in time domain, where a quantity of consecutive OFDM symbols that are occupied by a mini-slot is less than a quantity of OFDM symbols occupied by a slot to which the mini-slot belongs. One slot may include a plurality of mini-slots.

(7) Control channel resources include at least one candidate control channel resource set, where the candidate control channel resource set includes one or more candidate control channel resources. When the access network device sends downlink data information to the terminal, the terminal detects the one or more candidate control channels in the candidate control channel resource set, where control information sent to the terminal is carried on the one or more candidate control channels.

(8) A first control channel may also be referred to as a slot control channel, and is carried on a time-frequency resource of a slot. Information carried on the first control channel is used to indicate resource locations of a data channel and a control channel in the slot. In this application, the first control channel and the slot control channel are often used interchangeably. A set of a plurality of first control channels includes one or more candidate first control channels, where control information sent by the access network device to the terminal is carried on the one or more first candidate control channels.

(9) A second control channel may also be referred to as a mini-slot control channel, and is carried on a time-frequency resource of a mini-slot. Information carried on the second control channel is used to indicate a resource location of a data channel in the mini-slot. In this application, the slot in which the first control channel is carried includes at least one mini-slot, and the second control channel is carried in the mini-slot. In this application, the second control channel and the mini-slot control channel are often used interchangeably. A set of a plurality of second control channels includes one or more candidate second control channels, where control information sent by the access network device to the terminal is carried on the one or more second candidate control channels.

(10) A unit time-frequency resource element is a resource element including a plurality of consecutive OFDM symbols, and is not defined in frequency domain. A quantity of the plurality of consecutive OFDM symbols may be, for example, 2, 7, or 14. A subcarrier width of the unit time-frequency resource element may be configured by using system higher layer signaling or may be pre-defined. The higher layer signaling includes but is not limited to RRC signaling, system information, broadcast information, or the like. The unit time-frequency resource element includes one mini-slot group, where the mini-slot group includes at least one mini-slot.

(11) A time-domain location is a location of an OFDM symbol in a slot or a mini-slot.

(12) A time-domain location of a mini-slot in which a second control channel is carried a time-frequency resource area occupied by the mini-slot in which the second control channel is carried, that is, a location/locations of one or more OFDM symbols occupied by the mini-slot in which the second control channel is carried.

(13) A subcarrier width is a minimum granularity in frequency domain. For example, a subcarrier width of one subcarrier is 15 kHz in LTE.

(14) "A plurality of" means two or more than two. The term "and/or" is used to describe an association relationship of associated objects and represents that three relationships may exist. For example, A and/or B may represent the following three cases: Only A exists, both A and B exist, and only B exists. The character "/" generally indicates an "or" relationship between the associated objects.

In addition, it should be understood that, unless otherwise stated, in the embodiments of this application, ordinal numbers such as "first" and "second" are intended to distinguish between a plurality of objects, and not intended to limit a sequence, a time sequence, a priority, or an importance degree of the plurality of the objects.

An application scenario described in the embodiments of this application is intended to more clearly describe the technical solutions in the embodiments of this application, and does not constitute a limitation on the technical solutions provided in the embodiments of this application. A person of ordinary skill in the art may know that, with evolution of a network architecture and emergence of a new service scenario, the technical solutions provided in the embodiments of this application are also applicable to a similar technical problem.

FIG. 1 is a schematic diagram of a possible network architecture in an embodiment of this application. A communications system in FIG. 1 may include a terminal 10 and an access network device 20. The access network device 20 is configured to provide a communications service for the terminal 10 and connect the terminal 10 to a core network. The terminal 10 accesses the network by searching for a synchronization signal, a broadcast signal, and the like sent by the access network device 20, so as to communicate with the network. Arrows shown in FIG. 1 may represent uplink and downlink transmission performed over cellular links between the terminal 10 and the access network device 20.

That the access network device 20 sends downlink data information in a slot granularity to the terminal 10 is indicated by using control information carried on a first control channel. That the access network device 20 sends downlink data information in a mini-slot granularity to the terminal 10 may be indicated by using control information carried on a second control channel. A slot in which the first control channel is carried includes at least one mini-slot, and the second control channel is carried in the mini-slot. A subcarrier width used for the first control channel is a first subcarrier width, a subcarrier width used for the second control channel is a second subcarrier width, and the first subcarrier width is different from the second subcarrier width.

In a possible scenario, the access network device 20 sends, to the terminal 10 in a first frequency band (frequency band), first control information carried on the first control channel, and the terminal 10 receives the first control information in the first frequency band. The access network device 20 sends, to the terminal 10 in a second frequency band, second control information carried on the second control channel, and the terminal receives the second control information in the second frequency band. The first frequency band and the second frequency band are orthogonal to each other in frequency domain; and the first frequency band and the second frequency band may be the same or different.

It should be noted that, a scenario shown in FIG. 1 is described by using interaction between only one access network device and one terminal, and should not constitute any limitation on an application scenario of this application. There may be a plurality of access network devices and a plurality of terminals in an actual network architecture. For example, one terminal may transmit data with only one access network device, or may transmit data with a plurality of access network devices. One access network device may transmit data with one terminal, or may transmit data with a plurality of terminals. This is not specifically limited in this application.

Figure 2:
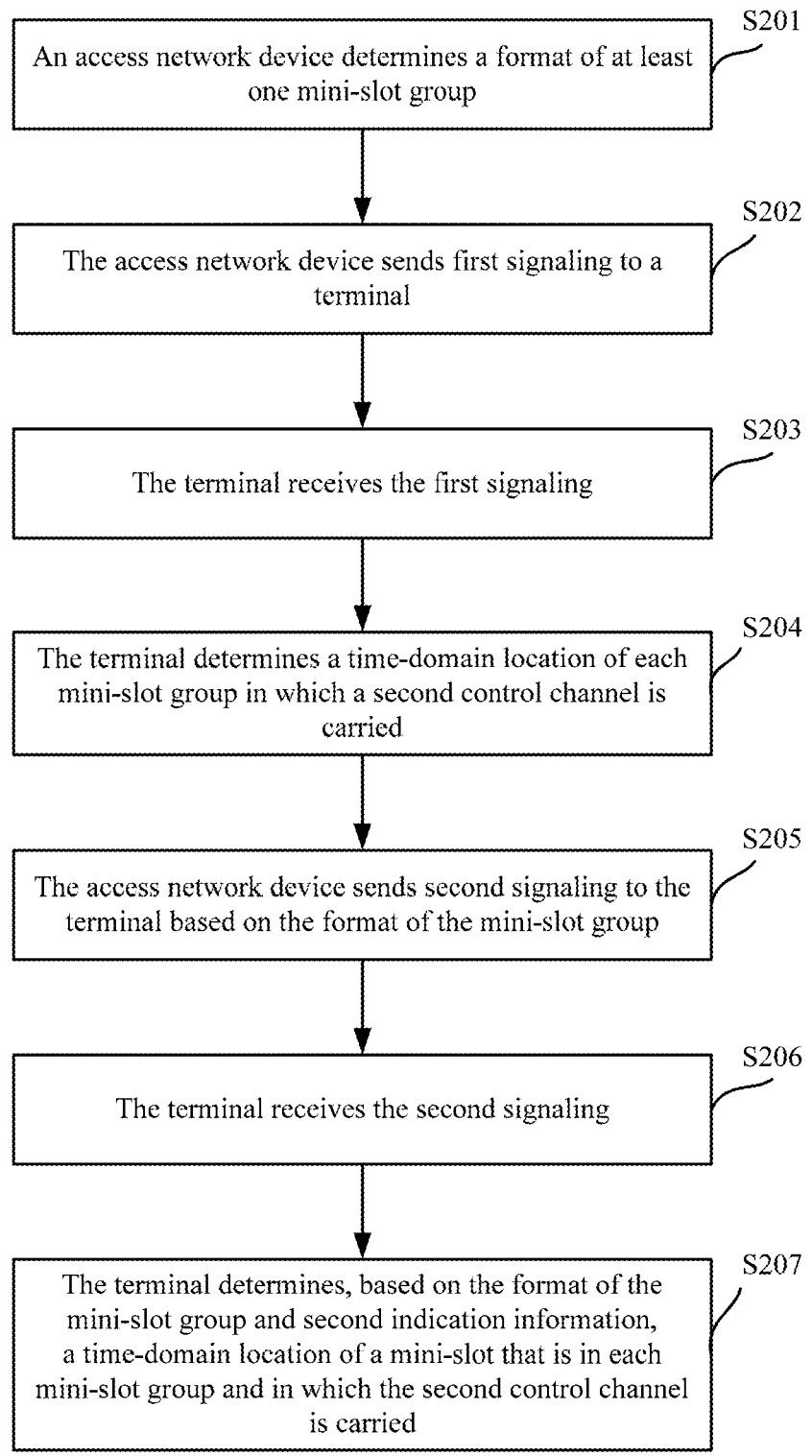
FIG. 2 is a schematic flowchart of a communication method according to an embodiment of this application.

A communication method 200 provided in an embodiment of this application is described in detail based on the foregoing description with reference to FIG. 2.

Referring to FIG. 2, the method includes the following steps.

S201. An access network device determines a format of at least one mini-slot group.

Specifically, the access network device determines the format of the at least one mini-slot group based on a first subcarrier width used for a first control channel and a second subcarrier width used for a second control channel. A slot in which the first control channel is carried includes the at least one mini-slot group, the mini-slot group includes at least one mini-slot, the second control channel is carried in the mini-slot, and the first subcarrier width is different from the second subcarrier width. It should be noted that, in this application, the first subcarrier width used for the first control channel is a subcarrier width used for sending the first control channel, and the second subcarrier width used for the second control channel is a subcarrier width used for sending the second control channel.

For details on how the access network device determines the subcarrier width used for the first control channel and the subcarrier width used for the second control channel, and how the access network device determines the format of the mini-slot group based on the first subcarrier width and the second subcarrier width, refer to the following detailed description.

Figure 3:
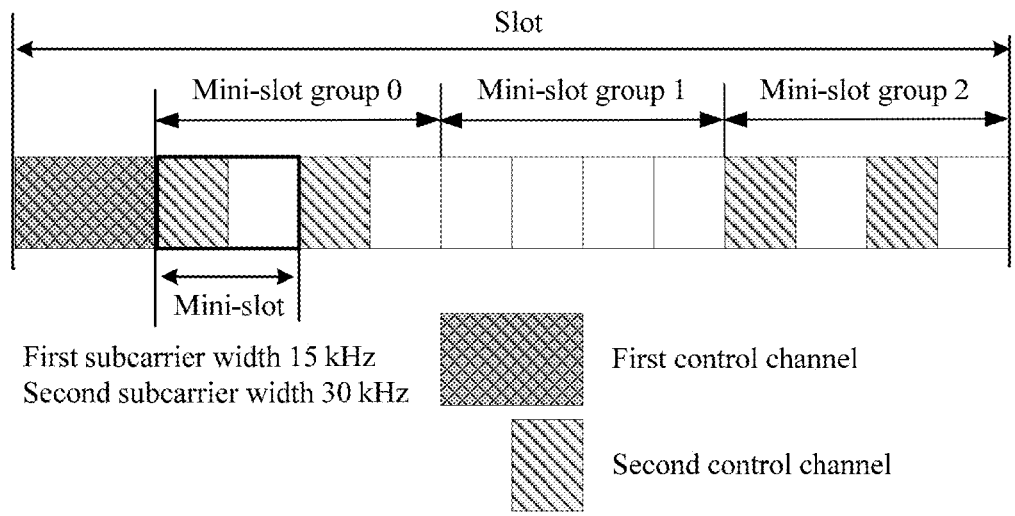
FIG. 3 is a schematic structural diagram showing that different subcarrier widths are used for a first control channel and a second control channel according to an embodiment of this application.

FIG. 3 is a schematic structural diagram showing that different subcarrier widths are used for a slot and a mini-slot. It should be understood that, a structure including the slot, mini-slot groups, and mini-slots is only an example, and does not constitute a limitation on this application. Referring to FIG. 3, a first subcarrier width is 15 kHz, and one slot occupies seven OFDM symbols in time domain. A first control channel occupies a first starting OFDM symbol of the slot in time domain. The slot includes three mini-slot groups, and each mini-slot group includes two mini-slots. A second subcarrier width is 30 kHz, and each mini-slot occupies two OFDM symbols in time domain.

In a specific implementation of this application, as the subcarrier width used for the second control channel increases, a quantity of mini-slots included in the mini-slot group increases. For example, when the subcarrier width used for the second control channel is a third subcarrier width, a quantity of mini-slots in one mini-slot group corresponding to the third subcarrier width is a first value; when the subcarrier width used for the second control channel is a fourth subcarrier width, a quantity of mini-slots in one mini-slot group corresponding to the fourth subcarrier width is a second value; and a ratio of the first value to the second value is equal to a ratio of the third subcarrier width to the fourth subcarrier width.

The following describes how the access network device determines the subcarrier width used for the first control channel and the subcarrier width used for the second control channel.

The subcarrier width used for the first control channel may be pre-defined in a standard or may be configured. For example, the subcarrier width used for the first control channel is pre-defined as 15 kHz in a standard, or is configured by using a synchronization signal, broadcast information, and system information. When a carrier is less than 6 GHz, optional subcarrier widths are 15 kHz, 30 kHz, and 60 kHz; and when a carrier is greater than 6 GHz, optional subcarrier widths are 120 kHz, 240 kHz, and the like. The subcarrier width is not limited to the five values.

In an optional manner, the access network device may determine, based on a type of a sent or received data service, the subcarrier width used for the second control channel. For example, if a data service type is a low latency service (such as a URLLC service), the subcarrier width used for the second control channel is greater than the subcarrier width used for the first control channel. For example, the first subcarrier width is 15 kHz, and the second subcarrier width is 60 kHz. In an optional manner, the access network device determines, based on a frequency band of a sent or received data service, the subcarrier width used for the second control channel. For example, when a frequency band occupied by a data service is a first frequency band, the first carrier width is 15 kHz, and the second subcarrier width is 60 kHz; and when a frequency band occupied by a data service is a second frequency band, the first subcarrier width is 15 kHz, and the second subcarrier width is 30 kHz. Both the first frequency band and the second frequency band are in reception bandwidth of the terminal. In another optional manner, the access network device may alternatively determine, based on a carrier frequency of a sent or received data service, the subcarrier width used for the second control channel. For example, when a carrier frequency occupied by a data service is an unlicensed spectrum (Unlicensed Spectrum), to access the unlicensed spectrum more flexibly, the subcarrier width for the slot is set to 15 kHz, and the subcarrier width for the mini-slot is set to 60 kHz. User equipment detects a candidate control channel carried in the mini-slot to determine a start time to access the unlicensed spectrum. A time granularity of the mini-slot is very small, so that a start time at which the user equipment accesses the unlicensed spectrum is flexible enough, where the unlicensed spectrum includes a spectrum used for a Wi-Fi device.

It should be noted that, the foregoing illustrated manner of determining the subcarrier width used for the first control channel and the subcarrier width used for the second control channel is only an example, and should not constitute a limitation on this application. By reading this application, a person skilled in the art can think of another manner to determine the subcarrier width used for the first control channel and the subcarrier width used for the second control channel. This is a meaning that should be covered in this application, and details are not described herein.

The following specifically describes how the access network device determines the format of the at least one mini-slot group based on the first subcarrier width and the second subcarrier width.

Specifically, the format of the mini-slot group includes a quantity of mini-slots included in one mini-slot group and a quantity of OFDM symbols occupied by each mini-slot. The following information may be configured in a standard pre-definition manner or a higher layer signaling configuration manner: a quantity of OFDM symbols occupied by one slot; a quantity of mini-slot groups included in one slot; a quantity of mini-slots included in each mini-slot group, and a quantity of OFDM symbols occupied by each mini-slot, so as to determine the format of the at least one mini-slot group.

In a first specific implementation, one slot occupies seven OFDM symbols. A time-frequency resource corresponding to one mini-slot group in time domain and frequency domain remains unchanged. To be specific, a product of duration corresponding to one mini-slot group in time domain and a bandwidth width corresponding to the mini-slot group in frequency domain remains unchanged. The subcarrier width used for the first control channel is F1. When the subcarrier width used for the second control channel is F1, one slot may include three mini-slot groups, each mini-slot group includes one mini-slot, and each mini-slot occupies two OFDM symbols. When the subcarrier width used for the second control channel is F2, one slot may include three mini-slot groups, each mini-slot group may include two mini-slots, and each mini-slot occupies two OFDM symbols. When the subcarrier width used for the second control channel is 60 kHz, each mini-slot group includes four mini-slots, and each mini-slot occupies two OFDM symbols. In this application, F2=2*F1.

In a second specific implementation, one slot occupies seven OFDM symbols. A time-frequency resource corresponding to one mini-slot group in time domain and frequency domain remains unchanged. To be specific, a product of duration corresponding to one mini-slot group in time domain and a bandwidth width corresponding to the mini-slot group in frequency domain remains unchanged. For example, the subcarrier width used for the first control channel is F1. When the subcarrier width used for the second control channel is F1, one slot includes two mini-slot groups, each mini-slot group includes one mini-slot, and each mini-slot occupies three OFDM symbols. When the subcarrier width used for the second control channel is F2, one slot may include two mini-slot groups, each mini-slot group may include three mini-slots, and each mini-slot occupies two OFDM symbols; or one slot may include two mini-slot groups, each mini-slot group may include two mini-slots, and each mini-slot occupies three OFDM symbols.

In a third specific implementation, one slot includes seven OFDM symbols. When the subcarrier width used for the second control channel is different, a time-frequency resource corresponding to one mini-slot group in time domain and frequency domain may vary. Formats of mini-slot groups may be made to correspond to different first subcarrier widths and second subcarrier widths in a standard pre-definition manner or a higher layer signaling configuration manner. For example, the subcarrier width used for the first control channel is F1. When the subcarrier width used for the second control channel is F1, one slot includes two mini-slot groups, each mini-slot group includes one mini-slot, and each mini-slot occupies three OFDM symbols. When the subcarrier width used for the second control channel is F2, one slot may include three mini-slot groups, each mini-slot group may include two mini-slots, and each mini-slot occupies two OFDM symbols; or one slot may include three mini-slot groups, each mini-slot group may include one mini-slot, and each mini-slot occupies four OFDM symbols.

In a fourth specific implementation, one slot may include 14 OFDM symbols. When the subcarrier width used for the first control channel is F1, and the subcarrier width used for the second control channel is F1, one slot may include two mini-slot groups, where a first mini-slot group includes two mini-slots, each mini-slot occupies three OFDM symbols, a second mini-slot group includes two mini-slots, one mini-slot occupies three OFDM symbols, and the other mini-slot occupies four OFDM symbols; or one slot may include four mini-slot groups, where a first mini-slot group, a second mini-slot group, and a third mini-slot group each include one mini-slot, each mini-slot occupies three OFDM symbols, a fourth mini-slot group includes one mini-slot, and the mini-slot occupies four OFDM symbols. When the subcarrier width used for the first control channel is F1, and the subcarrier width used for the second control channel is F2, one slot may include two mini-slot groups, and a first mini-slot group may include four mini-slots, where a first mini-slot, a second mini-slot, and a third mini-slot each occupy three OFDM symbols, and a fourth mini-slot occupies four OFDM symbols; or one slot may include four mini-slot groups, a first mini-slot group and a third mini-slot group each may include two mini-slots, each mini-slot occupies three OFDM symbols, a second mini-slot group and a fourth mini-slot group each may include two mini-slots, a first mini-slot occupies three OFDM symbols, and a second mini-slot occupies four OFDM symbols.

It should be noted that, the foregoing specific formats of the mini-slot groups illustrated in the first to the fourth specific implementations are only examples, and should not constitute a limitation on this application. By reading this application document, a person skilled in the art can determine any format of the mini-slot group through standard pre-definition or higher layer signaling configuration. Specific formats of the mini-slot are not described herein again. Specifically, when the corresponding format of the mini-slot group is configured, a mapping relationship between a first subcarrier width, a second subcarrier width, and a format of a mini-slot group may be established, and the access network device and the terminal may separately store the mapping relationship.

S202. The access network device sends first signaling to a terminal.

Specifically, the first signaling includes first indication information, and the first indication information is used to indicate a time-domain location of each mini-slot group in which a second control channel is carried.

The access network device may send the first indication information to the terminal by using control information carried on the first control channel. A time-frequency resource occupied by the first control channel may be a time-frequency resource area of a plurality of consecutive OFDM symbols including a starting OFDM symbol in the slot. A time-frequency resource in each slot generally includes a control area and a data area, where the control area is used to send control information, and the data area is used to send data. In this embodiment of this application, the time-frequency resource occupied by the first control channel may be a time-frequency resource included in a control area of a slot in which the first control channel is carried. It should be noted that in this embodiment of this application, the first control channel includes but is not limited to a physical downlink control channel (English: Physical Downlink Control Channel, PDCCH), an enhanced physical downlink control channel (English: Enhanced Physical Downlink Control Channel, EPDCCH), a new radio physical downlink control channel (English: New radio Physical Downlink Control Channel, NR-PDCCH), a group common control channel (English: Group Common Control Channel, GCCCH), a physical control format indicator channel (Physical Control Format Indicator Channel, PCFICH), a physical control format indicator channel-like channel (English: PCFICH-like Channel), a physical layer broadcast channel (English: L1 Broadcast Channel), or a control channel that is in an NR system and that is used to perform a same or similar function.

The access network device determines a format of the first signaling based on the first subcarrier width used for the first control channel and the second subcarrier width used for the second control channel, and obtains the first indication information based on the format of the first signaling.

The determining, by the access network device, a format of the first signaling includes determining a type of a related field included in the first signaling, carried content, and a length of the carried content. The related field includes but is not limited to a field that carries the first indication information. Optionally, in addition to the first indication information, the first signaling may further include but is not limited to indication information used to indicate data channel resource allocation and/or indication information used to indicate a modulation and coding scheme.

The determining, by the access network device, a format of the first signaling based on the first subcarrier width and the second subcarrier width includes determining a length of the field that carries the first indication information. The access network device may determine the format of the mini-slot group based on the first subcarrier width used for the first control channel and the second subcarrier width used for the second control channel, and configure, based on the format of the mini-slot group, the length of the field that carries the first indication information.

In a specific implementation, the length L1 of the field that is used to carry the first indication information is related to a ratio of f1 to f2. For example, if the first subcarrier width is f1, and the second subcarrier width is f2, L1=A f2/f1, where A is a natural number, and a specific value of A may be set depending on an actual requirement.

For example, f1=15 kHz, and f2=30 kHz, and if A=3, the length of the field is six bits.

In a specific implementation, several bits in the first signaling may be used to carry the first indication information. Each bit (in a bitmap form) of the several bits is used to indicate whether the second control channel is carried in each mini-slot group. As shown in FIG. 3, the first subcarrier width is 15 kHz, the second subcarrier width is 30 kHz, and the slot includes three mini-slot groups, which are respectively denoted as a mini-slot group 0, a mini-slot group 1, and a mini-slot group 2. A second control channel is carried in each of the mini-slot group 0 and the mini-slot group 2, and no second control channel is carried in the mini-slot group 1. In this case, the first signaling includes three bits for carrying the first indication information. The first indication information received by user equipment is {1, 0, 1}, which indicates that second control channel resources are configured in the mini-slot group 0 and the mini-slot group 2, where 1 denotes existence, and 0 denotes non-existence. Certainly, 1 and 0 each may alternatively denote an opposite meaning, that is, 1 denotes non-existence, and 0 denotes existence. Therefore, the first indication information may be denoted as {0, 1, 0}. This is not specifically limited in this application.

In a specific implementation, the time-domain location of each mini-slot group in which a second control channel is carried may alternatively be indicated by using a binary value of the several bits. For example, for a specified combination of the first subcarrier width and the second subcarrier width, the time-domain location of each mini-slot group in which the second control channel is carried is indicated based on a preset pattern (pattern) by using a mapping relationship between the binary value and the pattern. For example, the first signaling may include three bits. When the three bits are {0, 0, 0}, that is, a binary value is 0, the three bits are corresponding to a pattern shown in FIG. 3. Therefore, it can be determined that the second control channel is configured in only the mini-slot group 0 and the mini-slot group 2. Similarly, when the three bits are {0, 0, 1}, that is, a binary value is 2, the three bits may be corresponding to another pattern. It can be determined, based on the pattern, that a second control channel resource is configured in only the mini-slot group 0 and the mini-slot group 1. Whether a binary value or a bit mapping manner is specifically used may be pre-defined in a standard, or may be indicated by adding one bit to the first signaling. This is not specifically limited in this application.

The following specifically describes the mapping relationship between the binary value and the pattern. The access network device may store a mapping relationship table, where the mapping relationship table is used to store the mapping relationship between the binary value and the pattern. Correspondingly, the terminal also stores the mapping relationship table, to store the mapping relationship between the binary value and the pattern. For example, the mapping relationship may be established in the following manner: Each pattern may be numbered, and one specific binary value is corresponding to a number (ID) of one pattern. FIG. 3 is used as an example. The binary value is 0, and is corresponding to a pattern 1, where the pattern 1 indicates that the second control channel resource is configured in only the first mini-slot group 0 and the second mini-slot group 2. It should be noted that, the foregoing manner for establishing the mapping relationship is only an example, and the mapping relationship may be specifically established in various different manners. Any means that can be thought of by a person skilled in the art to establish the correspondence is covered in a mapping rule in this embodiment of this application. The mapping relationship table may be specifically implemented in various different manners. The correspondence may be represented in a table form or in another manner. This is not limited in this application.

In FIG. 3, one slot includes seven OFDM symbols, and includes three mini-slot groups, each mini-slot group includes two mini-slots, and each mini-slot includes two OFDM symbols. It should be noted that this is only an example, and should not constitute a limitation on this application. By reading this application, a person skilled in the art can think of that: one slot may occupy another quantity of OFDM symbols, for example, 14 OFDM symbols; one slot may include a plurality of mini-slot groups; each mini-slot group may include another quantity of mini-slots; and each mini-slot may include another quantity of OFDM symbols, for example, three OFDM symbols. In an NR system or a future communications system, a format of a mini-slot group may be pre-defined in a standard or configured by using higher layer signaling or another physical layer signaling, and a format of the first indication information is determined based on the configured format of the mini-slot group. Details are not described herein.

S203. The terminal receives the first signaling.

The terminal determines, based on the first indication information, the time-domain location of each mini-slot group in which the second control channel is carried.

Specifically, a specific manner in which the terminal determines the format of the first signaling is similar to a manner in which the access network device determines the format of the first signaling. For detailed description, refer to the foregoing specific description on how the access network device determines the format of the first signaling. Details are not described herein again.

S204. The terminal determines a time-domain location of each mini-slot group in which the second control channel is carried.

The terminal determines, based on the first indication information, the time-domain location of each mini-slot group in which the second control channel is carried. The terminal determines, based on a binary value of bits included in the first indication information or by using a bit mapping method, the time-domain location of each mini-slot group in which the second control channel is carried. Whether a binary value or a bit mapping manner is specifically used may be pre-defined in a standard, or may be indicated by adding one bit to the first signaling. This is not specifically limited in this application.

S205. The access network device sends second signaling to the terminal based on the format of the mini-slot group.

The second signaling includes second indication information, where the second indication information is used to indicate a time-domain location of a mini-slot that is in each mini-slot group and in which the second control channel is carried. Refer to the foregoing description, the access network device determines the format of the mini-slot group based on the first subcarrier width and the second subcarrier width, namely, a quantity of mini-slots included in the mini-slot group and a quantity of OFDM symbols occupied by each mini-slot are determined. On this basis, the access network device may determine a specific format of the second indication information.

The access network device may send the second indication information to the terminal in various manners. In a first possible implementation, the access network device sends the second indication information to the terminal by using higher layer signaling. The higher layer signaling includes but is not limited to a master information block (Master Information Block, MIB), a system information block (System Information Block, SIB), Radio Resource Control (Radio Resource Control, RRC) signaling, higher layer broadcast signaling, or other higher layer signaling with a similar feature.

In a second possible implementation, the access network device sends the second indication information to the terminal by using initial access information (Initial Access related information). The initial access information includes a preamble signal (Message 1), a random access feedback message (Message 2), a Message 3, a Message 4, and the like. The Message 4 may be an RRC establishment command or an RRC reestablishment command sent by the access network device to the terminal in LTE.

The second indication information is sent by using the higher layer signaling or the initial access information, so that an overhead caused by carrying the second indication information by using control information can be reduced, and data transmission efficiency of a physical layer is improved.

Figure 4:
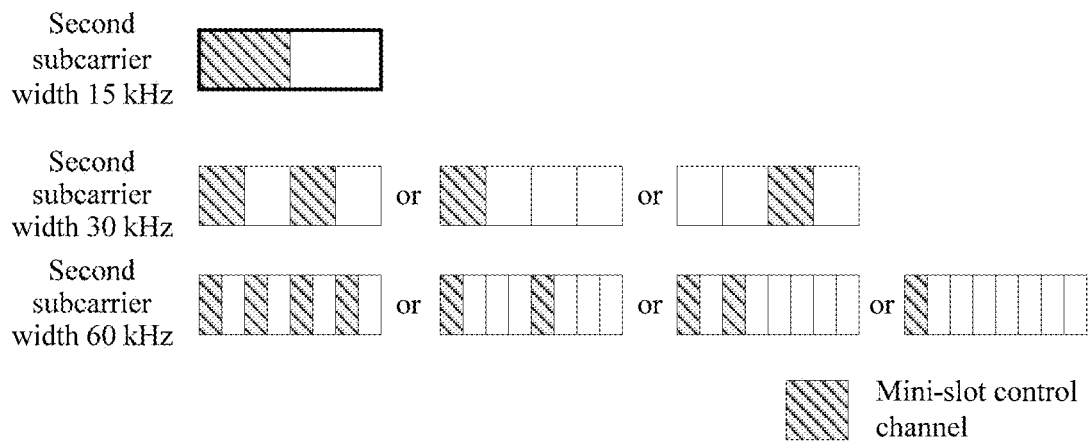
FIG. 4 is a schematic diagram showing that different subcarrier widths are used for second control channels according to an embodiment of this application.

The following specifically describes the second indication information with reference to FIG. 3 and FIG. 4.

It can be learned with reference to FIG. 3 that, the terminal can determine, based on indication of the first indication information, that the second control channel resource is carried in the mini-slot group 0 and the mini-slot group 2. On this basis, the terminal further determines, based on the second indication information, a time-domain location of the second control channel carried in each mini-slot group in which the second control channel is carried.

FIG. 4 schematically lists a possible pattern of each mini-slot group when a subcarrier width for a mini-slot is 15 kHz, 30 kHz, and 60 kHz. As a subcarrier width used for the second control channel increases, a quantity of time-domain locations of mini-slots included in a mini-slot group increases. As one slot occupies different OFDM symbols, a quantity of mini-slot groups included in one slot, a quantity of mini-slots included in each mini-slot group, and a quantity of OFDM symbols occupied by each mini-slot also vary. For example, if a quantity of symbols included in each mini-slot remains unchanged, when the first subcarrier width is used for the second control channel, a quantity of mini-slots included in a mini-slot group is a first value, and when the second subcarrier width is used for the second control channel, a quantity of mini-slots included in a mini-slot group is a second value; and a ratio of the first value to the second value is equal to a ratio of the first subcarrier width to the second subcarrier width. In this embodiment of this application, patterns of mini-slot groups may be the same or different. For example, the second indication information may be specifically used to indicate a format pattern of each mini-slot group included in each slot, or may be specifically used to indicate, in a bit mapping manner, a time-domain location of each second control channel in each mini-slot group.

In a specific implementation, several bits in the second signaling may be used to carry the second indication information. Optionally, each bit (in a bitmap form) of the several bits is used to indicate a time-domain location of a mini-slot in which a second control channel is carried. With reference to FIG. 3 and the foregoing description on the second indication information, the terminal device determines that there are the second control channel in the mini-slot group 0 and the mini-slot group 2. However, the terminal cannot determine, based on only the foregoing information, a specific time-domain location of the second control channel in the mini-slot group. For the scenario in FIG. 3, a possible form of the second indication information is {1, 0, 1, 0} based on indication of the second indication information. To be specific, it can be determined, in a bitmap form, that the second control channel is carried in a first OFDM symbol and a third OFDM symbol in each mini-slot group. Therefore, the time-domain location of the second control channel carried in the mini-slot group in which the second control channel is carried can be determined.

In a specific implementation, the time-domain location of the mini-slot in which the second control channel is carried may alternatively be indicated by using a binary value of the several bits. For example, for a specified combination of the first subcarrier width and the second subcarrier width, a time-domain location of each mini-slot group in which a second control channel is carried is indicated based on a preset pattern (pattern) by using a mapping relationship between the binary value and the pattern. For example, the second indication information may include three bits. When the three bits are {0, 0, 0}, that is, a binary value is 0, the three bits are corresponding to a pattern shown in FIG. 3. Therefore, it can be determined that the second control channel is configured in only the mini-slot group 0 and the mini-slot group 2. Similarly, when the three bits are {0, 0, 1}, that is, a binary value is 2, the three bits may be corresponding to another pattern. It can be determined, based on the pattern, that the second control channel is configured in only the mini-slot group 0 and the mini-slot group 1. Whether a binary value or a bit mapping manner is specifically used may be pre-defined in a standard, or may be indicated by adding one bit to the second signaling. This is not specifically limited in this application.

For specific description on the mapping relationship between the binary value and the pattern, refer to the foregoing description on the mapping relationship between the binary value and the pattern in a related part of the first indication information. Details are not described herein again.

It should be noted that, the value of the first subcarrier width, the value of the second subcarrier width, a mini-slot group format configuration, signaling used to carry the first indication information and the second indication information, and a field or a format of the signaling are only an example, and do not constitute a limitation on this application. By reading this application document, a person skilled in the art can think of using another field or format of another signaling to carry the first indication information and the second indication information, and can also think of using different indication information to indicate a change corresponding to different subcarrier widths and/or different mini-slot group format configurations. This is a meaning that should be covered in this application, and details are not described herein.

S206. The terminal receives the second signaling.

S207. The terminal determines, based on the format of the mini-slot group and the second indication information, a time-domain location of a mini-slot that is in each mini-slot group and in which the second control channel is carried.

Optionally, the terminal obtains a format of the second signaling based on the first subcarrier width and the second subcarrier width, and obtains the second indication information based on the format of the second signaling.

In a specific implementation, after determining the first subcarrier width and the second subcarrier width, the access network device sends third indication information to the terminal, to indicate the first subcarrier width and the second subcarrier width. After receiving the third indication information, the terminal obtains the first subcarrier width and the second subcarrier width based on the third indication information. Optionally, the terminal obtains the format of the first signaling based on the first subcarrier width and the second subcarrier width, and obtains the first indication information based on the format of the first signaling. Optionally, the terminal obtains the format of the second signaling based on the first subcarrier width and the second subcarrier width, and obtains the second indication information based on the format of the second signaling.

The access network device may send the third indication information in various manners. In a first possible implementation, the access network device sends the indication information to the terminal by using higher layer signaling. For example, the higher layer signaling includes a master information block (Master Information Block, MIB), a system information block (System Information Block, SIB), Radio Resource Control (Radio Resource Control, RRC) signaling, or other higher layer signaling with a similar feature.

In a second possible implementation, the access network device sends the indication information to the terminal by using downlink control information (Downlink Control Information, DCI), for example, sends the third indication information in common search space of a downlink control channel. A time-frequency resource of the downlink control channel is at least one OFDM symbol including a starting OFDM symbol of a slot or a subframe; the search space is a part of the time-frequency resource of the downlink control channel; and control information in the common search space may be received by a group of terminals or all terminals in a cell.

In a third possible implementation, the access network device sends the third indication information to the terminal by using physical layer broadcast control signaling, where the physical layer broadcast control signaling is, for example, broadcast signaling carried on a PCFICH channel in LTE. A time-frequency resource occupied by the physical layer broadcast control signaling is at least one OFDM symbol including a starting OFDM symbol of a slot or a subframe, and the physical layer broadcast control signaling may be detected and received by a group of terminals or all terminals in a cell.

Certainly, the access network device may alternatively send the third indication information in another manner, and no examples are given herein for description.

In a specific implementation, after determining the time-domain location of the mini-slot in which the second control channel is carried, the terminal may blindly detect, at the determined time-domain location, a second control channel carried in each mini-slot, so as to determine a time-domain location of the second control channel that is in each mini-slot and on which control information sent by the access network device to the terminal is carried.

Optionally, after S207, the terminal may perform one or more of the following operations:

(1) The terminal detects the second control channel at the time-domain location of the mini-slot in which the second control channel is carried. Specifically, a set including the foregoing second control channel may include at least one candidate control channel set, and the terminal detects a target candidate control channel in the candidate control channel set at the time-domain location, where control information sent by the access network device to the terminal is carried on the target candidate control channel.

(2) The terminal sends uplink data at the time-domain location of the mini-slot in which the second control channel is carried. Specifically, the uplink data includes uplink control information and/or uplink data information.

According to the solution provided in the foregoing embodiment of this application, when a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried. According to the solution, indication flexibility is effectively improved. In addition, according to this solution, the terminal may detect the second control channel only at a specified time-domain location, without performing detection at other time-domain locations. In this way, energy consumption of detecting a control channel by the terminal can be effectively reduced.

Figure 5:
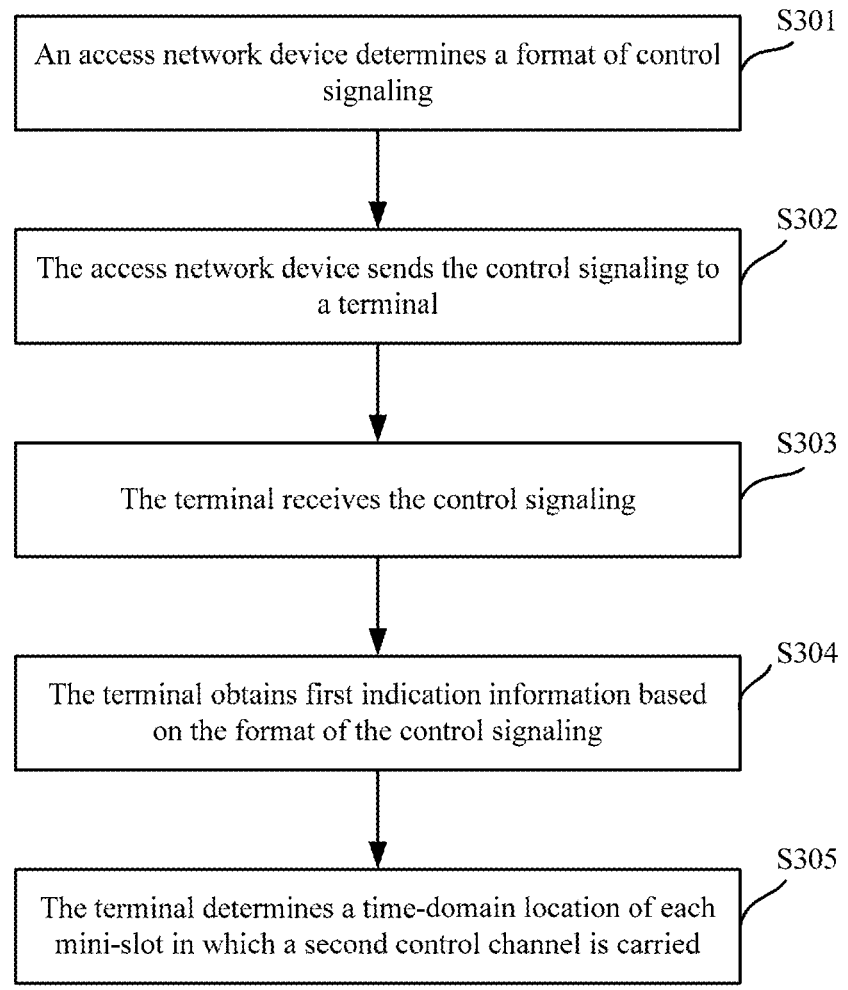
FIG. 5 is a schematic flowchart of a communication method according to an embodiment of this application.

The following describes a communication method 300 provided in an embodiment of this application in detail with reference to FIG. 5.

Referring to FIG. 5, the method 300 includes the following steps.

S301. An access network device determines a format of control signaling.

Specifically, the access network device determines the format of the control signaling based on a first subcarrier width used for a first control channel and a second subcarrier width used for a second control channel. The first subcarrier width is different from the second subcarrier width. A slot in which the first control channel is carried includes at least one mini-slot, and the mini-slot is used to carry the second control channel. The control signaling includes first indication information, and the first indication information is used to indicate a time-domain location of each mini-slot in which a control channel resource is carried. A set including the foregoing second control channel may include at least one candidate control channel set, and the terminal detects a target candidate control channel in the candidate control channel set at the time-domain location, where the target candidate control channel is used to carry control information sent by the access network device to the terminal.

In a specific implementation, the control signaling may be control information carried by using the first control channel. A time-frequency resource occupied by the first control channel may be a time-frequency resource area of a plurality of consecutive OFDM symbols including a starting OFDM symbol in the slot. It should be noted that in this embodiment of this application, the first control channel includes but is not limited to a physical downlink control channel (English: Physical Downlink Control Channel, PDCCH), an enhanced physical downlink control channel (English: Enhanced Physical Downlink Control Channel, EPDCCH), a new radio physical downlink control channel (English: New radio Physical Downlink Control Channel, NR-PDCCH), a group common control channel (English: Group Common Control Channel, GCCCH), a physical control format indicator channel (English: Physical Control Format Indicator Channel, PCFICH), a physical control format indicator channel-like channel (English: PCFICH-like Channel), a physical layer broadcast channel (English: L1 Broadcast Channel), or a control channel that is in an NR system and that is used to perform a same or similar function.

Refer to the foregoing description in a related part of the method 200 for how the access network device determines the subcarrier width used for the first control channel and the subcarrier width used for the second control channel. Details are not described herein again.

After determining the first subcarrier width and the second subcarrier width, the access network device sends second indication information to the terminal, to indicate the first subcarrier width used for the first control channel and the second subcarrier width used for the second control channel. After receiving the second indication information, the terminal obtains the first subcarrier width and the second subcarrier width based on the second indication information, so as to obtain the format of the control signaling based on the first subcarrier width and the second subcarrier width.

The access network device may send the second indication information in various manners. In a first possible implementation, the access network device sends the indication information to the terminal by using higher layer signaling. For example, the higher layer signaling includes a master information block (Master Information Block, MIB), a system information block (System Information Block, SIB), Radio Resource Control (Radio Resource Control, RRC) signaling, or other higher layer signaling with a similar feature.

In a second possible implementation, the access network device sends the indication information to the terminal by using downlink control information (Downlink Control Information, DCI), for example, sends the second indication information in common search space of a downlink control channel. A time-frequency resource of the downlink control channel is at least one OFDM symbol including a starting OFDM symbol of a slot or a subframe; the search space is a part of the time-frequency resource of the downlink control channel; and control information in the common search space may be received by a group of terminals or all terminals in a cell.

In a third possible implementation, the access network device sends the second indication information to the terminal by using physical layer broadcast control signaling, where the physical layer broadcast control signaling is, for example, broadcast signaling carried on a PCFICH channel in LTE. A time-frequency resource occupied by the physical layer broadcast control signaling is at least one OFDM symbol including a starting OFDM symbol of a slot or a subframe, and the physical layer broadcast control signaling may be detected and received by a group of terminals or all terminals in a cell.

Certainly, the access network device may alternatively send the second indication information in another manner, and no examples are given herein for description.

Figure 6:
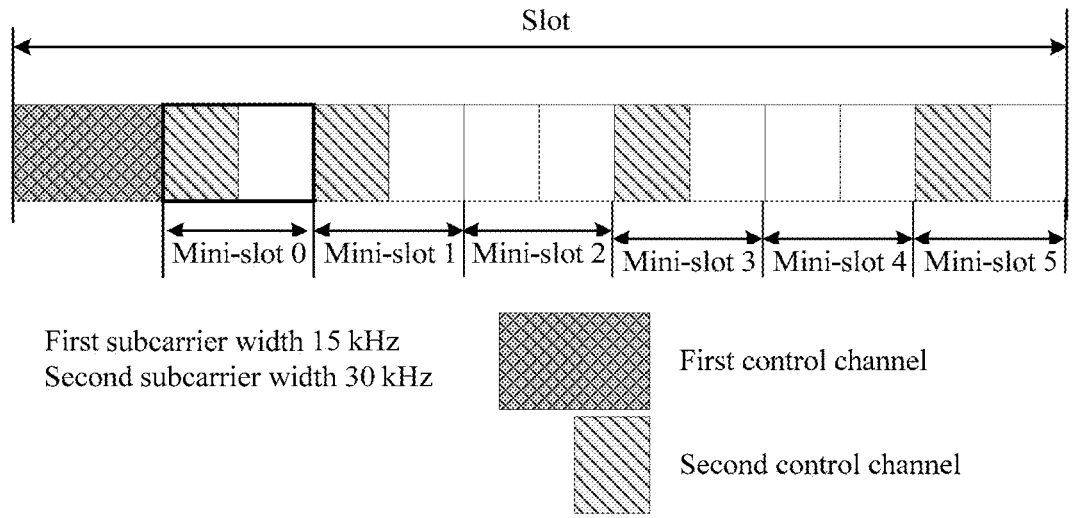
FIG. 6 is another schematic structural diagram showing that different subcarrier widths are used for a first control channel and a second control channel according to an embodiment of this application.

The following specifically describes, with reference to FIG. 3 and FIG. 6, how the access network device determines the format of the control signaling based on the first subcarrier width and the second subcarrier width.

The format of the control signaling includes a type of a related field of the control signaling, content carried in the related field, and a length of the carried content. The related field includes but is not limited to a field that carries the first indication information. Optionally, in addition to the first indication information, the control signaling may further include but is not limited to indication information used to indicate data channel resource allocation and/or indication information used to indicate a modulation and coding scheme.

The determining, by the access network device, the format of the control signaling based on the first subcarrier width and the second subcarrier width includes determining a format of a field that carries the first indication information. The format of the field that carries the first indication information includes but is not limited to a type of the field that carries the first indication information, carried content, and a length of the carried content.

For example, if the first subcarrier width is f1, and the second subcarrier width is f2, a length L1 of a field that is in the control signaling and that is used to indicate a time-domain location of each mini-slot in which a second control channel is carried is related to a ratio of f1 to f2. For example, L1=A f2/f1, where A is a natural number, and a specific value of A may be set depending on an actual requirement.

For example, f1=15 kHz, and f2=30 kHz, and if A=3, the length of the field is six bits.

In a specific implementation, several bits in the control signaling may be used to carry the first indication information.

Optionally, each bit (in a bitmap form) of the several bits is used to indicate the time-domain location of each mini-slot in which the second control channel is carried. The second control channel is used to carry control information sent by the access network device to the terminal. As shown in FIG. 6, a first subcarrier width is 15 kHz, a second subcarrier width is 30 kHz, each mini-slot occupies two OFDM symbols, and a slot shown in FIG. 6 includes six mini-slots. The first indication information includes six bits: {1, 1, 0, 1, 0, 1}, and each bit indicates whether there is a second control channel in a corresponding mini-slot. 1 denotes existence, and 0 denotes non-existence. Certainly, 1 and 0 each may alternatively denote an opposite meaning, that is, 1 denotes non-existence, and 0 denotes existence. Therefore, the first indication information may be denoted as {0, 1, 0}. This is not specifically limited in this application.

Optionally, the time-domain location of each mini-slot in which the second control channel is carried may alternatively be indicated by using a binary value of the several bits. For example, for a specified combination of the first subcarrier width and the second subcarrier width, the time-domain location of each mini-slot in which the second control channel is carried is indicated based on a preset pattern (pattern) by using a mapping relationship between the binary value and the pattern. For example, the first signaling may include three bits. When the three bits are {0, 0, 0}, that is, a binary value is 0, the three bits are corresponding to a pattern shown in FIG. 6. Therefore, it can be determined that a second control channel is carried in mini-slot 0, a mini-slot 1, a mini-slot 4, and a mini-slot 6, and no second control channel is carried in a mini-slot 3 and a mini-slot 5. Similarly, when the three bits are {0, 0, 1}, that is, a binary value is 2, the three bits may be corresponding to another pattern. For example, it can be determined, based on the pattern, that a second control channel is carried only in the mini-slot 3 and the mini-slot 5, and no second control channel is carried in the mini-slot 0, the mini-slot 1, the mini-slot 4, and the mini-slot 6. Optionally, the mapping relationship between the binary value and the pattern may be specifically pre-defined in a standard. The access network device and the terminal separately store the mapping relationship. Whether a binary value or a bit mapping manner is specifically used may be pre-defined in a standard, or may be indicated by adding one bit to the first signaling. This is not specifically limited in this application.

S302. The access network device sends the control signaling to a terminal.

S303. The terminal receives the control signaling.

S304. The terminal obtains the first indication information based on the format of the control signaling.

The terminal parses the control signaling based on the format of the control signaling, to obtain a format of the first indication information. Specifically, the obtaining a format of the first indication information may include obtaining a type of a field that carries the first indication information, carried content, and a length of the carried content, to obtain the first indication information.

S305. The terminal determines, based on the first indication information, a time-domain location of each mini-slot in which the second control channel is carried.

Optionally, after S305, the terminal may perform one or more of the following operations:

(1) The terminal detects the second control channel at the time-domain location of the mini-slot in which the second control channel is carried. Specifically, a set including the foregoing second control channel may include at least one candidate control channel set, and the terminal detects a target candidate control channel in the candidate control channel set at the time-domain location, where control information sent by the access network device to the terminal is carried on the target candidate control channel.

(2) The terminal sends uplink data at the time-domain location of the mini-slot in which the second control channel is carried. Specifically, the uplink data includes uplink control information and/or uplink data information.

According to the solution provided in the foregoing embodiment of this application, when a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried. According to the solution, indication flexibility is effectively improved. In addition, according to this solution, the terminal may detect the second control channel only at a specified time-domain location, without performing detection at other time-domain locations. In this way, energy consumption of detecting a control channel by the terminal can be effectively reduced.

The foregoing describes in detail the method 200 and the method 300 provided in the embodiments of this application with reference to FIG. 2 to FIG. 6, and the following describes in detail communications apparatuses and communications systems provided in embodiments of this application with reference to FIG. 7 to FIG. 14.

Figure 7:
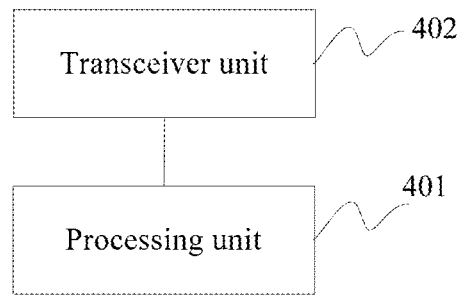
FIG. 7 is a schematic diagram of a communications apparatus according to an embodiment of this application.

FIG. 7 is a schematic diagram of a communications apparatus 400 according to an embodiment of this application. The communications apparatus 400 may be applied to the scenario in FIG. 1, and is configured to perform the method 200 shown in FIG. 2. As shown in FIG. 7, the communications apparatus 400 includes a processing unit 401 and a transceiver unit 402.

The processing unit 401 is configured to learn of a format of at least one mini-slot group based on a first subcarrier width used for a first control channel and a second subcarrier width used for a second control channel, where a slot in which the first control channel is carried includes the at least one mini-slot group, the mini-slot group includes at least one mini-slot, the second control channel is carried in the mini-slot, and the first subcarrier width is different from the second subcarrier width.

For related content of the processing unit 401, refer to description on step S201. Details are not described herein again.

The transceiver unit 402 is configured to receive first signaling sent by an access network device, where the first signaling includes first indication information.

For details of the foregoing content, refer to description on steps S202 and S203. Details are not described herein again.

The processing unit 401 is further configured to determine, based on the first indication information, a time-domain location of each mini-slot group in which the second control channel is carried.

For details of the foregoing content, refer to description on step S204. Details are not described herein again.

The transceiver unit 402 is further configured to receive second signaling sent by the access network device, where the second signaling includes second indication information.

For details of the foregoing content, refer to description on steps S205 and S206. Details are not described herein again.

The processing unit 401 is further configured to determine, based on the format of the mini-slot group and the second indication information, a time-domain location of a mini-slot that is in each mini-slot group and in which the second control channel is carried.

For the foregoing content, refer to description on step S207. Details are not described herein again.

In a specific implementation, the processing unit 401 is further configured to: learn of a format of the first signaling based on the first subcarrier width used for the first control channel and the second subcarrier width used for the second control channel, and obtain the first indication information based on the format of the first signaling.

In a specific implementation, the processing unit 401 is further configured to: obtain a format of the second signaling based on the first subcarrier width used for the first control channel and the second subcarrier width used for the second control channel, and obtain the second indication information based on the format of the second signaling.

In a specific implementation, the receiving unit 401 is further configured to receive third indication information. The processing unit 401 is further configured to obtain the first subcarrier width and the second subcarrier width based on the third indication information.

For details of the foregoing content, refer to description in a related part in the method embodiment 200. Details are not described herein again.

Optionally, the processing unit 401 may be further configured to detect the second control channel at the time-domain location of the mini-slot in which the second control channel is carried. Specifically, a set including the foregoing second control channel may include at least one candidate control channel set, and the terminal detects a target candidate control channel in the candidate control channel set at the time-domain location, where control information sent by the access network device to the terminal is carried on the target candidate control channel.

Optionally, the processing unit 401 may be further configured to send uplink data at the time-domain location of the mini-slot in which the second control channel is carried. Specifically, the uplink data includes uplink control information and/or uplink data information.

According to the solution provided in the foregoing embodiment of this application, when a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried. According to the solution, indication flexibility is effectively improved. In addition, according to this solution, the terminal may detect the second control channel only at a specified time-domain location, without performing detection at other time-domain locations. In this way, energy consumption of detecting a control channel by the terminal can be effectively reduced.

Figure 8:
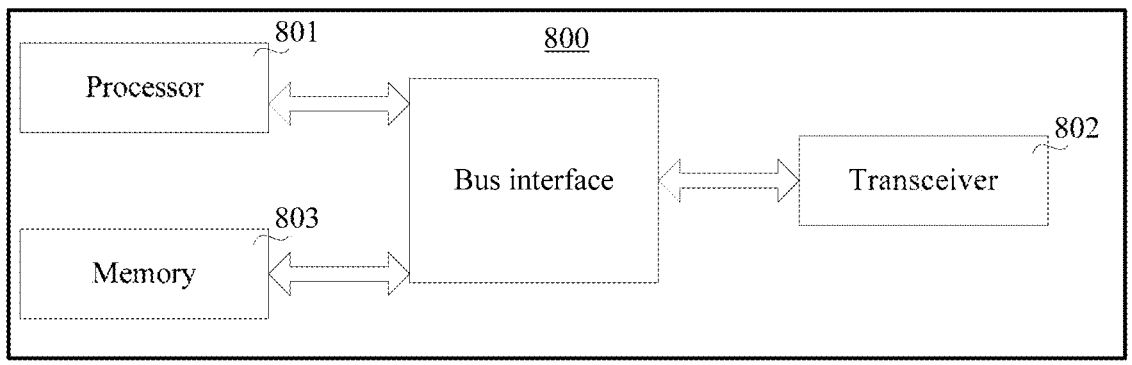
FIG. 8 is a schematic structural diagram of hardware of a communications apparatus according to an embodiment of this application.

It should be understood that, division of the units is merely logical function division, and during actual implementation, the units may be all or partially integrated into a physical entity, or may be physically separated. In this embodiment of this application, the transceiver unit 402 may be implemented by a transceiver, and the processing unit 401 may be implemented by a processor. As shown in FIG. 8, a terminal 800 may include a processor 801, a transceiver 802, and a memory 803. The memory 803 may be configured to store code or a program preinstalled in the terminal 800 at delivery, may also store code executed by the processor 801, and the like.

It should be understood that, the terminal 800 according to this embodiment of this application may be corresponding to the terminal in the communication method 200 according to the embodiment of this application and the terminal 800 in this embodiment of this application, and the foregoing and other operations and/or functions of each unit in the terminal 800 are intended to implement a corresponding process of the method 200 in FIG. 2. For brevity, details are not described herein again.

Figure 9:
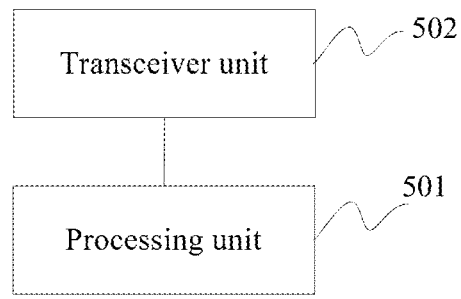
FIG. 9 is a schematic diagram of a communications apparatus according to an embodiment of this application.

Based on a same technical idea, an embodiment of this application further provides a communications apparatus. The apparatus may be applied to the scenario in FIG. 1, and is configured to perform the method 200 shown in FIG. 2. As shown in FIG. 9, the communications apparatus 500 includes a processing unit 501 and a transceiver unit 502.

The processing unit 501 is configured to determine a format of at least one mini-slot group based on a first subcarrier width used for a first control channel and a second subcarrier width used for a second control channel, where a slot in which the first control channel is carried includes the at least one mini-slot group, the mini-slot group includes at least one mini-slot, the second control channel is carried in the mini-slot, and the first subcarrier width is different from the second subcarrier width.

The transceiver unit 502 is configured to send first signaling to a terminal, where the first signaling includes first indication information, and the first indication information is used to indicate a time-domain location of each mini-slot group in which the second control channel is carried.

The processing unit 501 is further configured to send second signaling to the terminal based on the format of the mini-slot group, where the second signaling includes second indication information, and the second indication information is used to indicate a time-domain location of a mini-slot that is in each mini-slot group and in which the second control channel is carried.

In a specific implementation, the processing unit 501 is further configured to: determine a format of the first signaling based on the first subcarrier width used for the first control channel and the second subcarrier width used for the second control channel, and determine the first indication information based on the format of the first signaling.

In another specific implementation, the processing unit 501 is further configured to: determine a format of the second signaling based on the first subcarrier width used for the first control channel and the second subcarrier width used for the second control channel, and determine the second indication information based on the format of the second signaling.

In another specific implementation, the transceiver unit 502 is further configured to send third indication information to the terminal, where the third indication information is used to indicate the first subcarrier width used for the first control channel and the second subcarrier width used for the second control channel.

For details of the foregoing content, refer to description in a related part in the method 200. Details are not described herein again.

Figure 10:
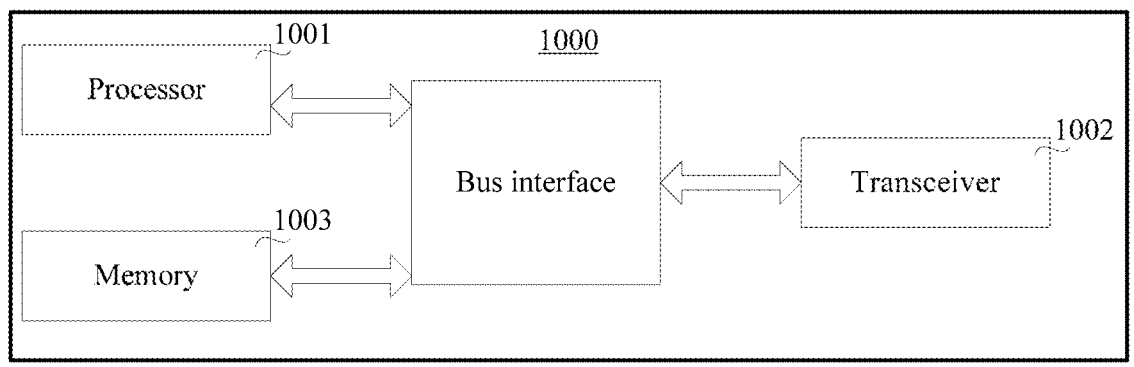
FIG. 10 is a schematic structural diagram of hardware of a communications apparatus according to an embodiment of this application.

It should be understood that, division of the units is merely logical function division, and during actual implementation, the units may be all or partially integrated into a physical entity, or may be physically separated. In this embodiment of this application, the transceiver unit 502 may be implemented by a transceiver, and the processing unit 501 may be implemented by a processor. As shown in FIG. 10, an access network device 1000 may include a processor 1001, a transceiver 1002, and a memory 1003. The memory 1003 may be configured to store code or a program preinstalled in the access network device 1000 at delivery, may also store code executed by the processor 1001, and the like.

It should be understood that, the access network device 1000 according to this embodiment of this application may be corresponding to the access network device in the communication method 200 according to the embodiment of this application and the access network device 1000 in this embodiment of this application, and the foregoing and other operations and/or functions of each unit in the access network device 1000 are intended to implement a corresponding process of the method 200 in FIG. 2. For brevity, details are not described herein again.

According to the solution provided in the foregoing embodiment of this application, when a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried. According to the solution, indication flexibility is effectively improved. In addition, according to this solution, the terminal may detect the second control channel only at a specified time-domain location, without performing detection at other time-domain locations. In this way, energy consumption of detecting a control channel by the terminal can be effectively reduced.

Figure 11:
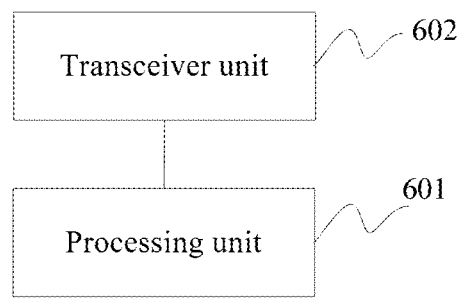
FIG. 11 is a schematic diagram of a communications apparatus according to an embodiment of this application.

FIG. 11 is a schematic diagram of a communications apparatus 600 according to an embodiment of this application. The communications apparatus 600 may be applied to the scenario in FIG. 1, and is configured to perform the method 300 shown in FIG. 5. As shown in FIG. 11, the communications apparatus 600 includes a processing unit 601 and a transceiver unit 602.

The processing unit 601 is configured to learn of a format of control signaling based on a first subcarrier width used for a first control channel and a second subcarrier width used for a second control channel, where the first subcarrier width is different from the second subcarrier width, a slot in which the first control channel is carried includes at least one mini-slot, and the second control channel is carried in the mini-slot.

The transceiver unit 602 is configured to receive the control signaling sent by the access network device, where the control signaling includes first indication information, and the indication information is used to indicate a time-domain location of each mini-slot in which the second control channel is carried.

The processing unit 601 is further configured to: obtain the first indication information based on the format of the control signaling, and determine, based on the first indication information, the time-domain location of each mini-slot in which the second control channel is carried.

In a specific implementation, the transceiver unit 602 is further configured to receive second indication information. The processing unit 601 is further configured to obtain the first subcarrier width and the second subcarrier width based on the second indication information.

In a specific implementation, the processing unit 601 is further configured to detect the second control channel at the time-domain location of each mini-slot in which the second control channel is carried; or the processing unit 601 is further configured to send uplink data at the time-domain location of each mini-slot in which the second control channel is carried.

For the foregoing content, refer to description on the method 300. Details are not described herein again.

Figure 12:
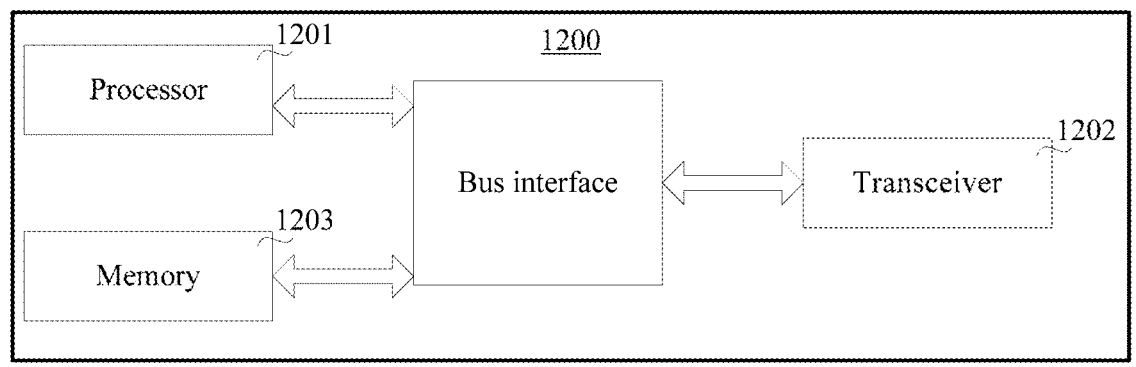
FIG. 12 is a schematic structural diagram of hardware of a communications apparatus according to an embodiment of this application.

It should be understood that, division of the units is merely logical function division, and during actual implementation, the units may be all or partially integrated into a physical entity, or may be physically separated. In this embodiment of this application, the transceiver unit 602 may be implemented by a transceiver, and the processing unit 601 may be implemented by a processor. As shown in FIG. 12, a terminal 1200 may include a processor 1201, a transceiver 1202, and a memory 1203. The memory 1203 may be configured to store code or a program preinstalled in the terminal 800 at delivery, may also store code executed by the processor 1201, and the like.

It should be understood that, the terminal 1200 according to this embodiment of this application may be corresponding to the terminal in the communication method 300 according to the embodiment of this application and the terminal 1200 in this embodiment of this application, and the foregoing and other operations and/or functions of each unit in the terminal 1200 are intended to implement a corresponding process of the method 300 in FIG. 5. For brevity, details are not described herein again.

According to the solution provided in the foregoing embodiment of this application, when a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried. According to the solution, indication flexibility is effectively improved. In addition, according to this solution, the terminal may detect the second control channel only at a specified time-domain location, without performing detection at other time-domain locations. In this way, energy consumption of detecting a control channel by the terminal can be effectively reduced.

Figure 13:
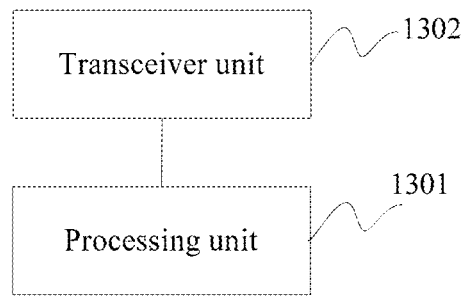
FIG. 13 is a schematic diagram of a communications apparatus according to an embodiment of this application.

FIG. 13 is a schematic diagram of a communications apparatus 1300 according to an embodiment of this application. The communications apparatus 1300 may be applied to the scenario in FIG. 1, and is configured to perform the method 300 shown in FIG. 5. As shown in FIG. 13, the communications apparatus 1300 includes a processing unit 1301 and a transceiver unit 1302.

The processing unit 1301 is configured to determine a format of control signaling based on a first subcarrier width used for a first control channel and a second subcarrier width used for a second control channel, where the first subcarrier width is different from the second subcarrier width, a slot in which the first control channel is carried includes at least one mini-slot, and the second control channel is carried in the mini-slot.

The transceiver unit 1302 is configured to send the control signaling to a terminal device based on the format of the control signaling, where the control signaling includes first indication information, and the indication information is used to indicate a time-domain location of each mini-slot in which the second control channel is carried.

In a specific implementation, the transceiver unit 1302 is further configured to send second indication information to the terminal, where the second indication information is used to indicate the first subcarrier width used for the first control channel and the second subcarrier width used for the second control channel.

Figure 14:
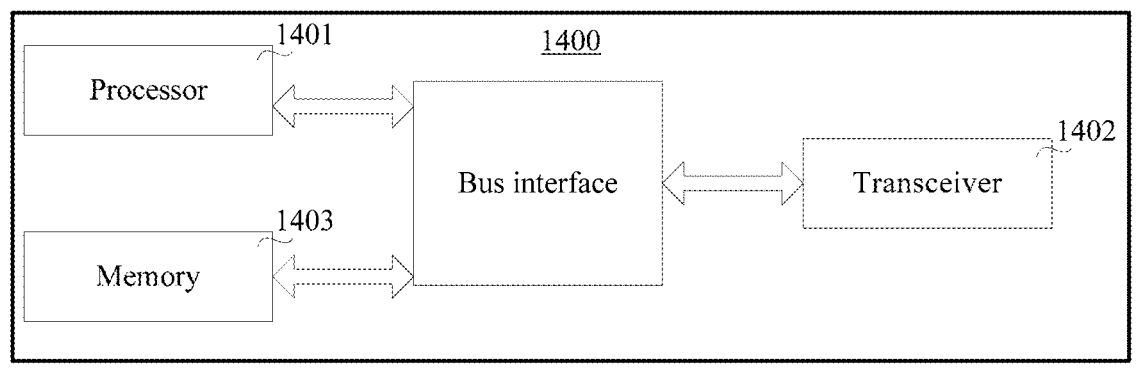
FIG. 14 is a schematic structural diagram of hardware of a communications apparatus according to an embodiment of this application.

It should be understood that, division of the units is merely logical function division, and during actual implementation, the units may be all or partially integrated into a physical entity, or may be physically separated. In this embodiment of this application, the transceiver unit 1302 may be implemented by a transceiver, and the processing unit 1301 may be implemented by a processor. As shown in FIG. 14, an access network device 1400 may include a processor 1401, a transceiver 1402, and a memory 1403. The memory 1403 may be configured to store code or a program preinstalled in the access network device 1400 at delivery, may also store code executed by the processor 1401, and the like.

It should be understood that, the access network device 1400 according to this embodiment of this application may be corresponding to the access network device in the communication method 300 according to the embodiment of this application and the access network device 1400 in this embodiment of this application, and the foregoing and other operations and/or functions of each unit in the access network device 1400 are intended to implement a corresponding process of the method 300 in FIG. 5. For brevity, details are not described herein again.

According to the solution provided in the foregoing embodiment of this application, when a subcarrier width used for the first control channel is different from a subcarrier width used for the second control channel, the terminal device finally determines, based on the first indication information and the second indication information that are sent by the access network device, a time-domain location of the second control channel on which control information sent by the access network device to the terminal is carried. According to the solution, indication flexibility is effectively improved. In addition, according to this solution, the terminal may detect the second control channel only at a specified time-domain location, without performing detection at other time-domain locations. In this way, energy consumption of detecting a control channel by the terminal can be effectively reduced.

This application further provides a communications system, including an access network device and a terminal. The terminal may be the communications apparatus provided in the embodiment corresponding to FIG. 7 or FIG. 8, and the access network device may be the communications apparatus provided in the embodiment corresponding to FIG. 9 or FIG. 10. The communications system is configured to perform the method 200 in the embodiment corresponding to FIG. 2.

This application further provides a communications system, including a terminal and an access network device. The terminal may be the communications apparatus provided in the embodiment corresponding to FIG. 11 or FIG. 12, and the access network device may be the communications apparatus provided in the embodiment corresponding to FIG. 13 or FIG. 14. The communications system is configured to perform the method 300 in the embodiment corresponding to FIG. 5.

In the embodiments of this application, the transceiver may be a wired transceiver, a wireless transceiver, or a combination thereof. The wired transceiver may be, for example, an Ethernet interface. The Ethernet interface may be an optical interface, an electrical interface, or a combination thereof. The wireless transceiver may be, for example, a wireless local area network transceiver, a cellular network transceiver, or a combination thereof. The processor may be a central processing unit (English: central processing unit, CPU for short), a network processor (English: network processor, NP for short), or a combination of a CPU and an NP. The processor may further include a hardware chip. The hardware chip may be an application-specific integrated circuit (English: application-specific integrated circuit, ASIC for short), a programmable logic device (English: programmable logic device, PLD for short), or a combination thereof. The PLD may be a complex programmable logic device (English: complex programmable logic device, CPLD for short), a field-programmable gate array (English: field-programmable gate array, FPGA for short), a generic array logic (English: generic array logic, GAL for short), or a combination thereof. The memory may be a volatile memory (English: volatile memory), such as a random-access memory (English: random-access memory, RAM for short); a non-volatile memory (English: non-volatile memory), such as a read-only memory (English: read-only memory, ROM for short), a flash memory (English: flash memory), a hard disk drive (English: hard disk drive, HDD for short), or a solid-state drive (English: solid-state drive, SSD for short), or a combination of the foregoing types of memories.

FIG. 8, FIG. 10, FIG. 12 and FIG. 14 may further include a bus interface. The bus interface may include any quantity of interconnected buses and bridges. Specifically, various circuits including one or more processors represented by a processor and a memory represented by a memory are connected. The bus interface may further connect various other circuits such as a peripheral device, a voltage stabilizer, and a power management circuit, which are known in the art. Therefore, further description is not provided herein. A bus interface provides an interface. The transceiver provides units configured to communicate with other various devices on a transmission medium. The processor is responsible for managing a bus architecture and normal processing. The memory may store data used when the processor is performing an operation.

It should be understood that sequence numbers of the foregoing processes do not mean execution sequences in various embodiments of this application. The execution sequences of the processes should be determined according to functions and internal logic of the processes, and should not be construed as any limitation on the implementation processes of the embodiments of this application.

A person of ordinary skill in the art may be aware that, in combination with the examples described in the embodiments disclosed in this specification, modules and method steps may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and module, refer to a corresponding process in the foregoing method embodiments. Details are not described herein again.

All or some of the foregoing embodiments may be implemented through software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a soft disk, a hard disk, or a magnetic tape), an optical medium (for example, DVD), a semiconductor medium (for example, a Solid State Disk (SSD)), or the like. The embodiments in this specification are all described in a progressive manner, for same or similar parts in the embodiments, reference may be made to these embodiments, and each embodiment focuses on a difference from other embodiments. Especially, apparatus and system embodiments are basically similar to the method embodiments, and therefore are described briefly. Refer to partial descriptions in the method embodiments for related parts.

In summary, it should be noted that what is described above is merely example embodiments of the technical solutions of this application, but is not intended to limit the protection scope of this application. Obviously, a person skilled in the art can make various modifications and variations to this application without departing from the scope of this application. If these modifications and variations fall within the scope defined by the claims of this application and their equivalent technologies, any modification, equivalent replacement, and improvement that is made shall fall within the protection scope of this application.

What is claimed is:

1. A communication method, comprising:
learning, by a terminal, a format of at least one mini-slot group based on a first subcarrier width used for a first control channel and a second subcarrier width used for a second control channel, wherein a slot in which the first control channel is carried comprises the at least one mini-slot group, wherein the at least one mini-slot group comprises at least one mini-slot, wherein the second control channel is carried in the at least one mini-slot, wherein the first subcarrier width is a minimum frequency granularity of a subcarrier in the first control channel, wherein the second subcarrier width is a minimum frequency granularity of a subcarrier in the second control channel, and wherein the first subcarrier width is different from the second subcarrier width;
receiving, by the terminal, first signaling sent by an access network device, wherein the first signaling comprises first indication information;
determining, by the terminal based on the first indication information, a time-domain location of each mini-slot group in which the second control channel is carried;
receiving, by the terminal, second signaling sent by the access network device, wherein the second signaling comprises second indication information; and
determining, by the terminal based on the format of the at least one mini-slot group and the second indication information, a time-domain location of a mini-slot that is in each mini-slot group and in which the second control channel is carried.

2. The method according to claim 1, wherein the method further comprises:
learning, by the terminal, a format of the first signaling based on the first subcarrier width and the second subcarrier width; and
obtaining the first indication information based on the format of the first signaling.

3. The method according to claim 1, wherein the method further comprises:
obtaining, by the terminal, a format of the second signaling based on the first subcarrier width and the second subcarrier width; and
obtaining the second indication information based on the format of the second signaling.

4. The method according to claim 1, wherein the method further comprises:
receiving, by the terminal, third indication information; and
obtaining, by the terminal, the first subcarrier width and the second subcarrier width based on the third indication information.

5. The method according to claim 1, wherein the first subcarrier width is 15 kHz, and the second subcarrier width is 30 kHz or 60 kHz.

6. A communication method, comprising:
determining, by an access network device, a format of at least one mini-slot group based on a first subcarrier width used for a first control channel and a second subcarrier width used for a second control channel, wherein a slot in which the first control channel is carried comprises the at least one mini-slot group, wherein the at least one mini-slot group comprises at least one mini-slot, wherein the second control channel is carried in the at least one mini-slot, wherein the first subcarrier width is a minimum frequency granularity of a subcarrier in the first control channel, wherein the second subcarrier width is a minimum frequency granularity of a subcarrier in the second control channel, and wherein the first subcarrier width is different from the second subcarrier width;
sending, by the access network device, first signaling to a terminal, wherein the first signaling comprises first indication information, and wherein the first indication information is used to indicate a time-domain location of each mini-slot group in which the second control channel is carried; and
sending, by the access network device, second signaling to the terminal based on the format of the at least one mini-slot group, wherein the second signaling comprises second indication information, and wherein the second indication information is used to indicate a time-domain location of a mini-slot that is in each mini-slot group and in which the second control channel is carried.

7. The method according to claim 6, wherein the method further comprises:
determining, by the access network device, a format of the first signaling based on the first subcarrier width and the second subcarrier width; and
determining the first indication information based on the format of the first signaling.

8. The method according to claim 6, wherein the method further comprises:
determining, by the access network device, a format of the second signaling based on the first subcarrier width and the second subcarrier width; and
determining the second indication information based on the format of the second signaling.

9. The method according to claim 6, wherein the method further comprises:
sending, by the access network device, third indication information to the terminal, wherein the third indication information is used to indicate the first subcarrier width and the second subcarrier width.

10. The method according to claim 6, wherein the first subcarrier width is 15 kHz, and the second subcarrier width is 30 kHz or 60 kHz.

11. A communication method, comprising:
learning, by a terminal, a format of control signaling based on a first subcarrier width used for a first control channel and a second subcarrier width used for a second control channel, wherein the first subcarrier width is a minimum frequency granularity of a subcarrier in the first control channel, wherein the second subcarrier width is a minimum frequency granularity of a subcarrier in the second control channel, wherein the first subcarrier width is different from the second subcarrier width, wherein a slot in which the first control channel is carried comprises at least one mini-slot, and wherein the second control channel is carried in the at least one mini-slot;

receiving, by the terminal, the control signaling sent by an access network device, wherein the control signaling comprises first indication information, and wherein the first indication information is used to indicate a time-domain location of each mini-slot in which the second control channel is carried;

obtaining, by the terminal, the first indication information based on the format of the control signaling; and determining, by the terminal based on the first indication information, the time-domain location of each mini-slot in which the second control channel is carried.

12. The method according to claim 11, wherein the method further comprises:

receiving, by the terminal, second indication information; and obtaining, by the terminal, the first subcarrier width and the second subcarrier width based on the second indication information.

13. The method according to claim 11, wherein the method further comprises:

detecting, by the terminal, the second control channel at the time-domain location of each mini-slot in which the second control channel is carried; or sending, by the terminal, uplink data at the time-domain location of each mini-slot in which the second control channel is carried.

14. The method according to claim 11, wherein the first subcarrier width is 15 kHz, and the second subcarrier width is 30 kHz or 60 kHz.

* * * * *